(12) United States Patent
McMenemy et al.

(10) Patent No.: US 11,093,315 B2
(45) Date of Patent: Aug. 17, 2021

(54) SYSTEMS AND METHODS FOR DETECTING A FAULT OR A MODEL MISMATCH

(71) Applicants: TOYOTA MOTOR ENGINEERING & MANUFACTURING NORTH AMERICA, INC., Plano, TX (US); UNIVERSITY OF CONNECTICUT, Farmington, CT (US)

(72) Inventors: Donald McMenemy, Willington, CT (US); Weiqiang Chen, Willington, CT (US); Ali M. Bazzi, South Windsor, CT (US); Krishna R. Pattipati, Mansfield, CT (US); Shailesh N. Joshi, Ann Arbor, MI (US)

(73) Assignees: Toyota Motor Engineering & Manufacturing North America, Inc., Plano, TX (US); University of Connecticut, Farmington, CT (US)

( * ) Notice: Subject to any disclaimer, the term of this patent is extended or adjusted under 35 U.S.C. 154(b) by 147 days.

(21) Appl. No.: 16/361,780

(22) Filed: Mar. 22, 2019

(65) Prior Publication Data
US 2020/0301772 A1 Sep. 24, 2020

(51) Int. Cl.
*G06F 11/07* (2006.01)
(52) U.S. Cl.
CPC .......... *G06F 11/079* (2013.01); *G06F 11/076* (2013.01); *G06F 11/0757* (2013.01)
(58) Field of Classification Search
CPC ... G06F 11/0757; G06F 11/076; G06F 11/079
See application file for complete search history.

(56) References Cited

U.S. PATENT DOCUMENTS 6,985,779 B2 * 1/2006 Hsiung .............. G05B 23/0221
700/19
7,447,609 B2 11/2008 Guralnik et al.
(Continued)

FOREIGN PATENT DOCUMENTS

| JP | 5813317 | 11/2015 |
|---|---|---|
| WO | 2008137062 | 11/2008 |
| WO | 2013156791 | 10/2013 |

OTHER PUBLICATIONS

Alkaya et al.; "Variance Sensitive Adaptive threshold-Based PCA Method for Fault Detection with Experimental Application"; ISA Transactions; vol. 50; pp. 287-302; (2011).*
(Continued)

*Primary Examiner* — Matthew M Kim
*Assistant Examiner* — Matthew N Putaraksa
(74) *Attorney, Agent, or Firm* — Dinsmore & Shohl LLP

(57) ABSTRACT

Systems and methods for detecting a fault or model mismatch are disclosed. A system includes a processor, a memory, and one or more sensors. The sensors may detect data associated with an electronic device. The memory may store processor executable instructions to: compute $T^2$ and $Q$ statistics, over a time period, and apply a model mismatch and fault detection logic based on the $T^2$ and $Q$ statistics. The model mismatch and fault detection logic may: count consecutive instances where a $T^2$ statistic exceeds a $T^2$ threshold via a $T^2$ counter, update a probability of fault based on the $T^2$ counter, count consecutive instances where a Q statistic exceeds a Q threshold via a Q counter, update a probability of model mismatch based on the Q counter, and detect one of a fault or a model mismatch based on a probability of fault threshold and a probability of model mismatch threshold.

19 Claims, 10 Drawing Sheets

(56) References Cited

U.S. PATENT DOCUMENTS

| | | | |
|---|---|---|---|
| 7,587,296 | B2 | 9/2009 | Harvey, Jr. et al. |
| 8,676,432 | B2 | 3/2014 | Patnaik et al. |
| 8,959,065 | B2 * | 2/2015 | Gorinevsky ....... G06Q 10/0639 |
| | | | 707/693 |
| 9,110,452 | B2 * | 8/2015 | Blevins ................... G06F 17/16 |
| 10,048,996 | B1 * | 8/2018 | Bell .................... G06F 11/3006 |
| 10,354,462 | B1 * | 7/2019 | Zhang ................. G07C 5/0808 |
| 2006/0265150 | A1 * | 11/2006 | Hu ..................... G01N 33/2823 |
| | | | 702/50 |
| 2007/0255442 | A1 * | 11/2007 | Nakamura ........... G05B 23/024 |
| | | | 700/108 |
| 2009/0112532 | A1 * | 4/2009 | Foslien ................ G06T 11/206 |
| | | | 703/2 |
| 2019/0188584 | A1 * | 6/2019 | Rao ........................ G06Q 10/00 |
| 2020/0041988 | A1 * | 2/2020 | Natsumeda .......... G05B 23/024 |
| 2020/0099217 | A1 * | 3/2020 | Meisinger ................ H02H 3/08 |

OTHER PUBLICATIONS

U.S. Appl. No. 15/947,702 IDS dated: (Apr. 6, 2018).*

* cited by examiner

SYSTEMS AND METHODS FOR DETECTING A FAULT OR A MODEL MISMATCH

BACKGROUND

Field

The present disclosure generally relates to systems and/or methods for detecting a fault or model mismatch based on operational data associated with an electronic device, and more specifically, to detecting a fault or model mismatch in real-time by applying model mismatch and fault detection logic to computed model metrics.

Technical Background

Some systems and methods for detecting a fault may merely calculate a $T^2$ statistic and/or a Q statistic from testing data and may compare that calculated $T^2$ statistic and/or Q statistic to respective predefined thresholds to predict a fault. Such systems and methods often result in the issuance of false positive alarms and fail to account for operational deviations not attributable to faulty operation of an electronic device.

SUMMARY

In one embodiment, a system including a processing device, one or more sensors, and a non-transitory, processor-readable memory component is disclosed. The one or more sensors may be communicatively coupled to the processing device and may be positioned relative to an electronic device to detect operational data associated with the electronic device. The non-transitory, processor-readable memory component may store programming instructions that, when executed by the processing device, cause the processing device to: compute at least two model metrics over a period of time based on the operational data from the one or more sensors, where the at least two model metrics include $T^2$ statistics and Q statistics, and apply a model mismatch and fault detection logic based on the $T^2$ statistics and Q statistics computed over the period of time. The model mismatch and fault detection logic may: count consecutive instances where a computed $T^2$ statistic exceeds a $T^2$ threshold via a $T^2$ counter, update a probability of fault associated with the electronic device over the time period based on the $T^2$ counter, count consecutive instances where a computed Q statistic exceeds a Q threshold via a Q counter, update a probability of model mismatch associated with the electronic device over the time period based on the Q counter, and detect one of a fault with the electronic device or a model mismatch based on a probability of fault threshold and a probability of model mismatch threshold.

In another embodiment, system including a server, a vehicle, one or more sensors and a non-transitory, processor-readable memory component is disclosed. The vehicle may be communicatively coupled to the server via a computer network. The one or more sensors may be communicatively coupled to the vehicle and may be positioned relative to an electronic device to detect operational data associated with the electronic device. The non-transitory, processor-readable memory component may store programming instructions that, when executed by a processing device, cause the processing device to: compute at least two model metrics over a period of time based on the operational data from the one or more sensors, where the at least two model metrics include $T^2$ statistics and Q statistics, and apply a model mismatch and fault detection logic based on the $T^2$ statistics and Q statistics computed over the period of time. The model mismatch and fault detection logic may: count consecutive instances where a computed $T^2$ statistic exceeds a $T^2$ threshold via a $T^2$ counter, update a probability of fault associated with the electronic device over the time period based on the $T^2$ counter, count consecutive instances where a computed Q statistic exceeds a Q threshold via a Q counter, update a probability of model mismatch associated with the electronic device over the time period based on the Q counter, and detect one of a fault with the electronic device or a model mismatch based on a probability of fault threshold and a probability of model mismatch threshold.

In yet another embodiment, a computer-implemented method is disclosed. The computer-implemented method may include computing, by a processing device, at least two model metrics over a period of time based on operational data associated with an electronic device from one or more sensors positioned relative to the electronic device, where the at least two model metrics include $T^2$ statistics and Q statistics, and applying, by the processing device, a model mismatch and fault detection logic based on the $T^2$ statistics and Q statistics computed over the period of time. The model mismatch and fault detection logic may: count consecutive instances where a computed $T^2$ statistic exceeds a $T^2$ threshold via a $T^2$ counter, update a probability of fault associated with the electronic device over the time period based on the $T^2$ counter, count consecutive instances where a computed Q statistic exceeds a Q threshold via a Q counter, update a probability of model mismatch associated with the electronic device over the time period based on the Q counter, and detect one of a fault with the electronic device or a model mismatch based on a probability of fault threshold and a probability of model mismatch threshold.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, wherein like structure is indicated with like reference numerals and in which:

DETAILED DESCRIPTION

Embodiments described herein present a system and/or a method that utilizes a model mismatch and fault detection logic to compute, on-vehicle and in real time, a probability of a model mismatch and a probability of a fault associated with an electronic device (e.g., a power converter, a semi-conductor device, and/or the like of an electrified vehicle). The probability of a fault and the probability of a model mismatch may be computed utilizing a model mismatch and fault detection logic as described herein. According to various aspects, the model mismatch and fault detection logic may evaluate $T^2$ statistics and/or Q statistics, associated with a Principal Component Analysis (PCA) model, relative to respective $T^2$ and Q thresholds. The model mismatch and fault detection logic of the present disclosure may add robustness to the system and/or the method by suppressing or rejecting a false alarm caused by a short excursion (e.g., a deviation from a regular pattern, path, or level of operation) that is not attributable to faulty operation of the electronic device. According to further aspects, upon a probable model mismatch, embodiments described herein may retrain the system to build a new model (e.g., generate a different PCA model or update the existing PCA model) to avoid a false alarm pertaining to a failure of the electronic device. Notably, the model mismatch and fault detection logic described herein introduces probability into the fault analysis which adds not only interpretability but also some statistical guarantees.

Electronic devices (e.g., power converters, semi-conductor devices, power electronics modules, and/or the like) are often operating at high power densities and high temperatures. In addition, electronic devices, particularly those located in vehicles, are often subject to large variations in the ambient temperature and the number of power cycles. Accordingly, an electronic device may be subject to large variations in not only the frequency but also the range of thermal cycling. Such operating and environmental conditions may lead to the electronic device experiencing an aging or degradation process and, eventually, device failure (e.g., bond wire failure, die attachment failure, substrate delamination, and/or the like). Unanticipated electronic device failure is not ideal. For example, if a vehicle's electronic device faults while being driven, that vehicle may be rendered unusable and may place the vehicle's occupants in a multitude of undesirable circumstances. Accordingly, a proactive and accurate prediction/detection of an electronic device fault is important.

Figure 1:
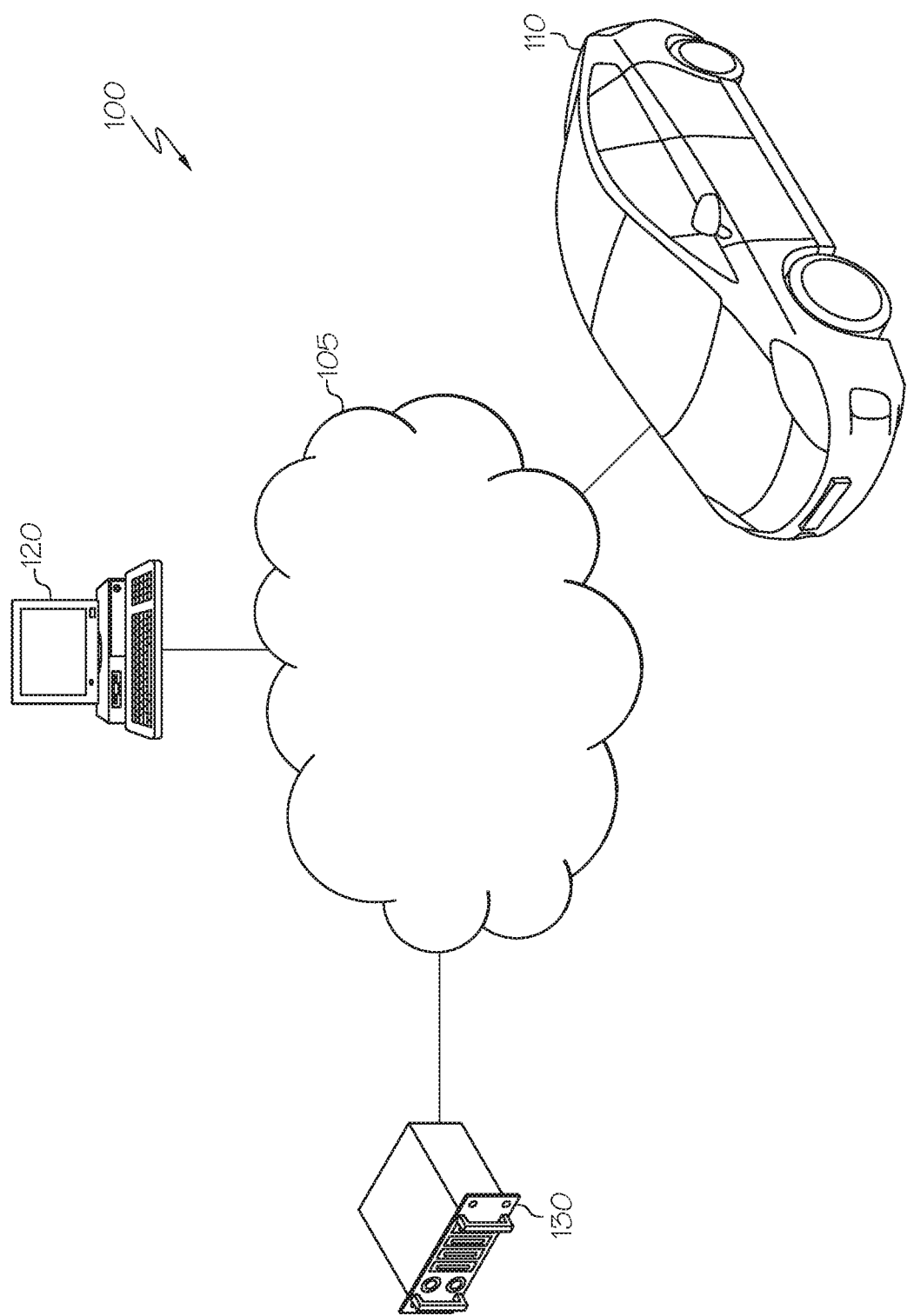
FIG. 1 schematically depicts an illustrative network having components for a model mismatch and a fault monitoring architecture according to embodiments shown and described herein.

Referring now to the drawings, FIG. 1 depicts an illustrative network 100 having components for a fault monitoring architecture according to embodiments shown and described herein. As illustrated in FIG. 1, a computer network 105 may include a wide area network (WAN), such as the Internet, a local area network (LAN), a mobile communications network, a public service telephone network (PSTN), a personal area network (PAN), a metropolitan area network (MAN), a virtual private network (VPN), and/or another network. The computer network 105 may generally be configured to electronically connect one or more devices such as computing devices and/or components thereof. Illustrative devices may include, but are not limited to, a vehicle 110, a user computing device 120, and a server computing device 130.

The vehicle 110 may generally be any vehicle with one or more onboard computing devices. The computing devices may contain hardware for processing data received from sensors positioned on, in, or near electronic devices (e.g., power converters, semiconductor devices, and/or the like) located on or in the vehicle 110. In addition, the computing devices may contain hardware for providing an interface (e.g., a graphical user interface (GUI), an illuminable dash message, and/or the like) to a user of the vehicle 110, where the interface provides a notification (e.g., visual warning, illuminated light) if a fault is detected. According to various aspects, if a fault is detected, vehicle computing devices may store the fault with or without the notification. It should be understood that while FIG. 1 only depicts a single vehicle 110 for the purposes of simplicity, the present disclosure is not limited to such. That is, the network 100 may include a plurality of vehicles 110 such that fault detection as described herein can be completed (e.g., via respective onboard computing devices) substantially simultaneously and independently for each of a plurality of electronic devices on each of the plurality of vehicles 110. According to various embodiments described herein, while the network 100 may include a computer network 105, a user computing device 120, and a server computing device 130, the vehicle 110 may only be connected to and/or interact with the computer network, the user computing device 120 and/or the server computing device 130 periodically and/or intermittently. Accordingly, the one or more computing device of each of the plurality of vehicles 110 may contain hardware and/or software programming to process sensor data and to apply the model mismatch and fault detection logic of the present disclosure independent of other network 100 components.

It should be understood that the vehicle 110 is merely an illustrative example of a system that contains one or more electronic devices in need of model mismatch and/or fault detection monitoring according to the embodiments described herein. That is, other systems may be monitored in lieu of a vehicle 110 without departing from the scope of the present disclosure. For example, systems such as robots, mobility systems (e.g., artificial intelligence devices, autonomous vehicle systems, and/or the like), manufacturing systems, utility systems (e.g., devices that are provided/ utilized by a utility company to distribute utility services such as electrical power), and/or the like may also be a part of the distributed architecture described herein. Regardless of the system that is monitored, it should be immediately apparent that the various components connected in the network 100 provide a particularly configured and designed system that can be used for detecting a model mismatch and/or a fault, as described herein.

Still referring to FIG. 1, the user computing device 120 may generally be used as an interface between a user and the other components connected to the computer network 105. Thus, the user computing device 120 may be used to perform one or more user-facing functions, such as receiving one or more inputs from a user and/or providing information to the user, as described in greater detail herein. Accordingly, the user computing device 120 may include at least a display and/or input hardware, as described in greater detail herein. In the event that the server computing device 130 requires oversight, updating, and/or correction, the user computing device 120 may be configured to provide the desired oversight, updating, and/or correction. The user computing device 120 may also be used to input additional data into a corpus of data stored on the server computing device 130. For example, the user computing device 120 may contain software programming or the like that allows a user to view model mismatch and/or fault detection monitoring data, review faults that are detected in a plurality of vehicles (including vehicle 110), and provide information accordingly.

The server computing device 130 may receive data from one or more data sources (e.g., the vehicle 110), analyze received data, generate data, store data, index data, search data, and/or provide data to the user computing device 120 and/or the vehicle 110 (or components thereof). According to various embodiments, the server computing device 130 may receive operational data (e.g., sensor data) from the vehicle 110 (e.g., via the computer network 105) and apply the model mismatch and fault detection logic of the present disclosure. According to various aspects, the server computing device 130 may apply the model mismatch and fault detection logic independent of the vehicle 110.

It should be understood that while the user computing device 120 is depicted as a personal computer and the server computing device 130 is depicted as a server, these are non-limiting examples. In some embodiments, any type of computing device (e.g., a mobile computing device, a personal computer, a server, a cloud-based network of devices, and/or the like) may be used for any of these components. Additionally, while each of these computing devices is illustrated in FIG. 1 as a single piece of hardware, this is also merely an example. Each of the user computing device 120 and the server computing device 130 may represent a plurality of computers, servers, databases, components, and/ or the like.

Figure 2A:
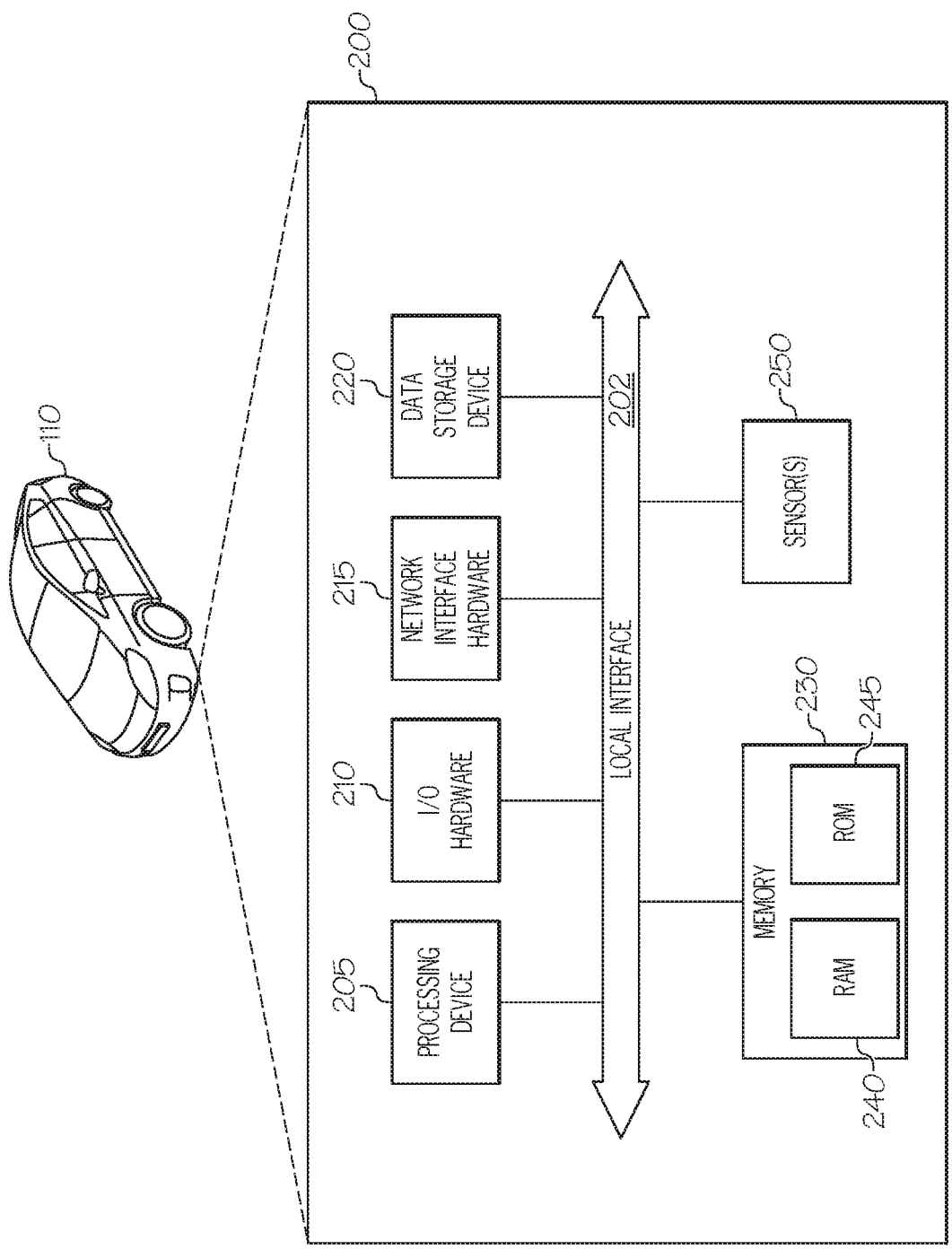
FIG. 2A depicts a block diagram of illustrative hardware components of a vehicle that may be used in monitoring electronic devices to detect a model mismatch and/or a fault according to one or more embodiments shown and described herein.

FIG. 2A schematically depicts a block diagram of illustrative hardware components of the vehicle 110 that may be used in monitoring one or more electronic devices of the vehicle 110 to detect a model mismatch and/or a fault in the one or more electronic devices.

The vehicle 110 may include a local component 200 (which may also be referred to herein as a vehicle component) having a non-transitory computer-readable medium for completing the various processes described herein, embodied as hardware, software, and/or firmware, according to embodiments shown and described herein. According to various embodiments, the local component 200 may be configured as a special purpose computer (e.g., a particular machine) designed specifically for performing the functionality described herein. Still referring to FIG. 2A, the local component 200 may generally be an onboard vehicle computing system. In some embodiments, the local component 200 may be a plurality of vehicle computing systems. Notably, as described herein, the local component 200 may be configured to process sensor data and to apply the model mismatch and fault detection logic of the present disclosure independent of other network components (e.g., the computer network 105, the user computing device 120, the server computing device 130 of network 100 of FIG. 1). According to some aspects, the local component 200 may utilize other network components (e.g., the computer network 105, the user computing device 120, the server computing device 130 of network 100 of FIG. 1) to process the sensor data and/or to apply the model mismatch and fault detection logic of the present disclosure (e.g., to utilize quicker and/or more efficient processing resources).

Again referring to FIG. 2A, the local component 200 may include a processing device 205, I/O hardware 210, network interface hardware 215, a data storage device 220, a non-transitory memory component 230, and one or more sensors 250. As described further herein, the one or more sensors 250 may be positioned on, in, near or otherwise associated with electronic devices (e.g., power converters, semiconductor devices, and/or the like) located on or in the vehicle 110. A local interface 202, such as a bus or the like, may interconnect the various components.

The processing device 205, such as a computer processing unit (CPU), may be the central processing unit of the local component 200, performing calculations and logic operations to execute a program. The processing device 205, alone or in conjunction with the other components, is an illustrative processing device, computing device, processor, or combination thereof. The processing device 205 may include any processing component configured to receive and execute instructions (such as from the data storage device 220 and/or the memory component 230).

The memory component 230 may be configured as a volatile and/or a nonvolatile computer-readable medium and, as such, may include random access memory 240 (including SRAM, DRAM, and/or other types of random access memory), read only memory (ROM) 245, flash memory, registers, compact discs (CD), digital versatile discs (DVD), and/or other types of storage components. The memory component 230 may include one or more programming instructions thereon that, when executed by the processing device 205, cause the processing device 205 to complete various processes, such as the model mismatch and fault detection logic described herein and the processes described herein with respect to FIG. 4. Still referring to FIG. 2A, the programming instructions stored on the memory component 230 may be embodied as a plurality of software logic modules, where each logic module provides programming instructions for completing one or more tasks, as described in greater detail below with respect to FIG. 2B.

The network interface hardware 215 may include any wired or wireless networking hardware, such as a modem, LAN port, wireless fidelity (Wi-Fi) card, WiMax card, mobile communications hardware, and/or other hardware for communicating with other networks and/or devices. For example, the network interface hardware 215 may provide a communications link between the vehicle 110 and the other components of the network 100 depicted in FIG. 1, including (but not limited to) the server computing device 130.

Still referring to FIG. 2A, the data storage device 220, which may generally be a storage medium, may contain one or more data repositories for storing data that is received (e.g., sensor data, training data, testing data, and/or the like) and/or generated (e.g., PCA model(s), $T^2$ and Q statistics, computations associated with the model mismatch and fault detection logic, and/or the like). The data storage device 220 may be any physical storage medium, including, but not limited to, a hard disk drive (HDD), memory, removable storage, and/or the like. While the data storage device 220 is depicted as a local device, it should be understood that the data storage device 220 may be a remote storage device, such as, for example, a server computing device or the like (e.g., the server computing device 130 of FIG. 1). Illustrative data that may be contained within the data storage device 220 is further described below with respect to FIG. 2C.

Still referring to FIG. 2A, the I/O hardware 210 may communicate information between the local interface 202 and one or more other components of the vehicle 110. For example, the I/O hardware 210 may act as an interface between the local component 200 and other components (e.g., mobile phone systems, infotainment systems, and/or the like). In some embodiments, the I/O hardware 210 may be utilized to transmit one or more commands to the other components of the vehicle 110 based on one or more inputs received from a user via the other monitoring components.

The one or more sensors 250 may include various hardware components for sensing characteristics of certain vehicle components, particularly electronic devices. The one or more sensors 250 are otherwise not limited by the present disclosure. For example, the one or more sensors 250 may be electrical sensors, temperature sensors, and/or the like. Illustrative characteristics that may be sensed and/or measured by the one or more sensors 250 include, but are not limited to, current, voltage, resistance, temperature, and the like. Each of the one or more sensors 250 may be positioned on, integrated with, positioned in line with, or positioned adjacent to one or more electronic devices to be measured or monitored. The one or more sensors 250 may generally be configured to sense the one or more characteristics (e.g., a current, a voltage, a temperature and/or the like) and to transmit data (e.g., operational data) corresponding to the one or more sensed characteristics, which is used to detect a model mismatch and/or a fault, as described in greater detail herein. As one example, a temperature sensor may be positioned within a housing of an engine control module to monitor a temperature adjacent to a particular semi-conductor device within the housing. In such an example, the monitored temperature may reflect not only heat generated by the semi-conductor device but also heat generated outside of the housing. As another example, a multi-meter device may be positioned in line with a throttle position sensor to monitor at least one of a voltage, a current, and/or a resistance associated with the throttle position sensor. In such an example, a voltage associated with the throttle position sensor should continually increase as the vehicle's throttle is opened and should continually decrease as the vehicle's throttle is closed. Accordingly, the multi-meter device may detect anomalous voltage (e.g., gaps in voltage, discontinuous voltage stints) as the throttle position sensor is operating.

Figure 2B:
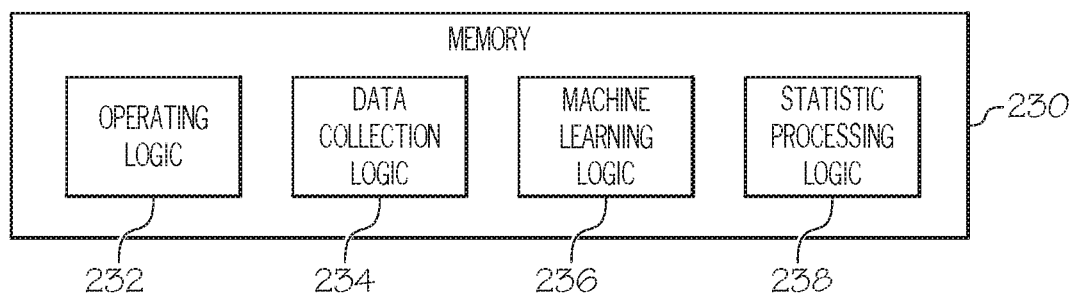
FIG. 2B depicts a block diagram of an illustrative memory component of a vehicle, the memory component containing illustrative logic components according to one or more embodiments shown and described herein.

In some embodiments, the program instructions contained on the memory component 230 may be embodied as a plurality of software modules, where each module provides programming instructions for completing one or more tasks. For example, FIG. 2B schematically depicts the memory component 230 containing illustrative logic components according to one or more embodiments shown and described herein. As shown in FIG. 2B, the memory component 230 may be configured to store various processing logic, such as, for example, operating logic 232, data collection logic 234, machine learning logic 236, and/or statistic processing logic 238 (each of which may be embodied as a computer program, firmware, or hardware, as an example). The operating logic 232 may include an operating system and/or other software for managing components of the local component 200 (FIG. 2A). The data collection logic 234 may contain one or more software modules for collecting data (e.g., operational data) from one or more sources (e.g., the one or more sensors 250 depicted in FIG. 2A, the server computing device 130 depicted in FIG. 1, and/or the like), converting data, transmitting data, and/or analyzing data, as described in greater detail herein. The machine learning logic 236 may contain one or more software modules for collecting data (e.g., training data, testing data), analyzing the data, and determining information from the data (e.g., PCA model), as described in greater detail herein. The statistic processing logic 238 may contain one or more software modules for determining whether certain received data (e.g. operational data) is indicative of a model mismatch and/or a fault, as described in greater detail herein.

Figure 2C:
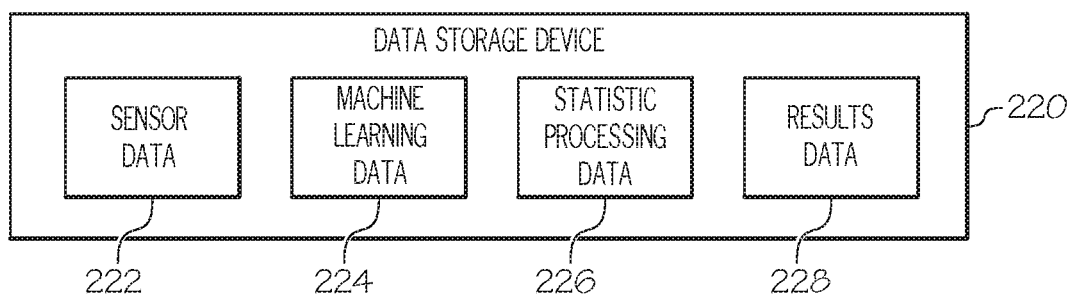
FIG. 2C depicts a block diagram of an illustrative data storage device of a vehicle, the data storage device containing illustrative data components according to one or more embodiments shown and described herein.

FIG. 2C schematically depicts a block diagram of various data contained within a storage device (e.g., the data storage device 220) of the local component 200 (FIG. 2A) according to one or more embodiments shown and described herein. As shown in FIG. 2C, the data storage device 220 may include, for example, sensor data 222, machine learning data 224, statistic processing data 226, and/or results data 228. Sensor data 222 may include, for example, data (e.g., operational data) received from the one or more sensors 250 (FIG. 2A). For example, sensor data 222 may include voltage outputs associated with a throttle position sensor, as described above. Machine learning data 224 may generally be teaching data and/or testing data for machine learning processes. For example, machine learning data 224 may include operational data known to be faulty and/or operational data known to be not faulty, which is usable by machine learning logic 236 to learn when particular situations indicate faulty or not faulty operation. Statistic processing data 226 may generally be data that is generated and/or accessed as a result of processing data received from the one or more sensors 250 (FIG. 2A) and/or data received from the server computing device 130 (FIG. 1). For example, statistic processing data 226 may include calculated $T^2$ statistics, calculated Q statistics, generated PCA model(s), and/or the like. Results data 228 may be data that corresponds to whether a model mismatch and/or a fault is detected, including time data, location data, transmission logs, and/or the like.

It should be understood that the components illustrated in FIGS. 2A-2C are merely illustrative and are not intended to limit the scope of this disclosure. More specifically, while the components in FIGS. 2A-2C are illustrated as residing within the local component 200 of the vehicle 110, this is a nonlimiting example. In some embodiments, one or more of the components may reside external to the local component 200 and/or the vehicle 110.

Figure 3A:
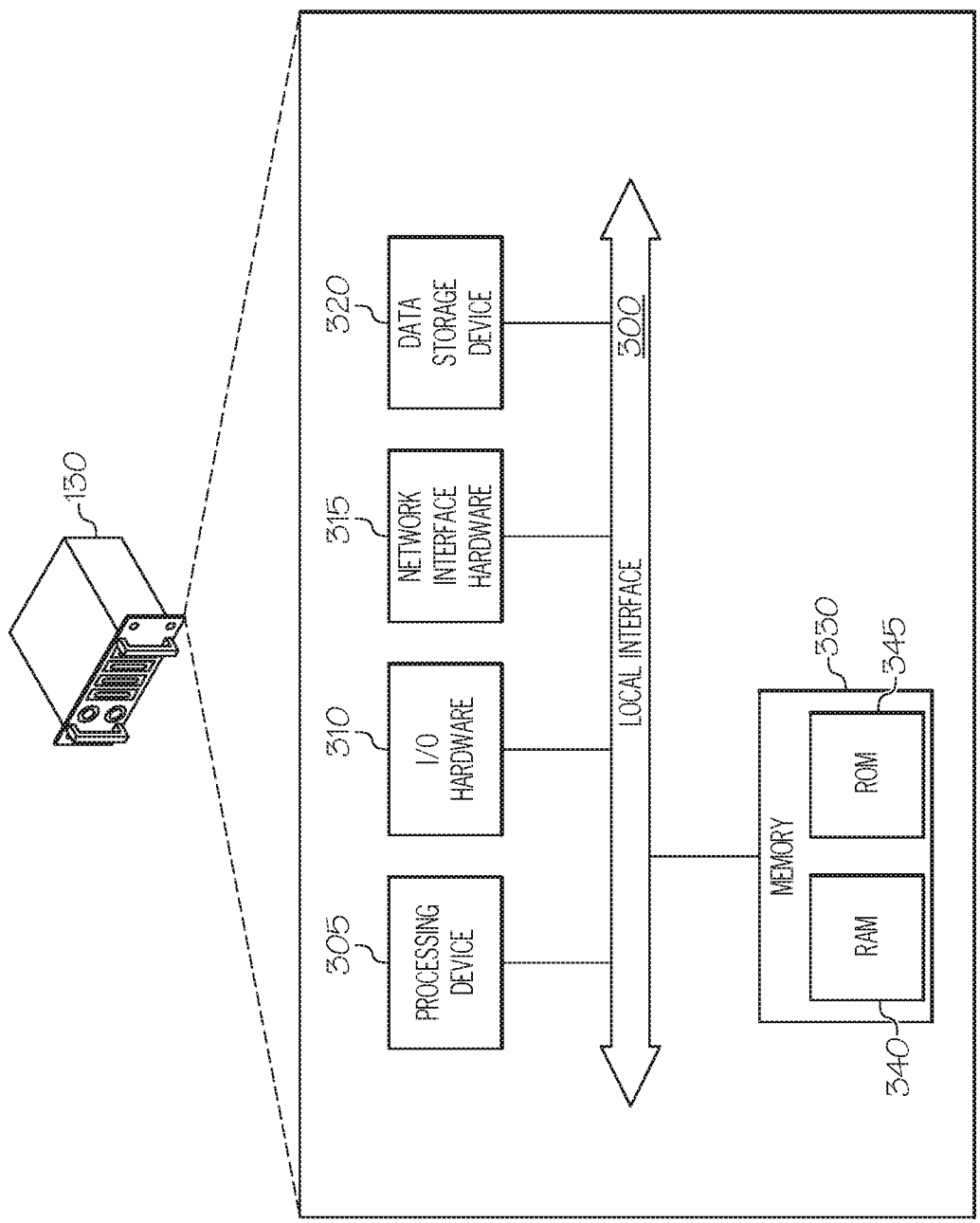
FIG. 3A depicts a block diagram of illustrative hardware components of a server computing device that may be used in monitoring electronic devices to detect a model mismatch and/or a fault according to one or more embodiments shown and described herein.

FIG. 3A schematically depicts illustrative hardware components of the server computing device 130 according to various aspects of the present disclosure. As noted herein, the server computing device 130 may receive operational data (e.g., sensor data) from the vehicle 110 (e.g., via the computer network 105 of FIG. 1) and apply the model mismatch and fault detection logic of the present disclosure independent of the vehicle 110 (FIG. 1) to monitor model mismatch and/or fault detection for one or more electronic device of the vehicle 110. According to various aspects, the server computing device may similarly monitor model mismatch and/or fault detection for a plurality of vehicles 110.

The server computing device 130 may include a non-transitory computer-readable medium for completing the various processes described herein, embodied as hardware, software, and/or firmware, according to embodiments shown and described herein. According to various embodiments, the server computing device 130 may be configured as a special purpose computer designed specifically for performing the functionality described herein. As described, the server computing device 130 may be configured to process received operational data (e.g., sensor data) and to apply the model mismatch and fault detection logic of the present disclosure independent of other network components (e.g., the computer network 105, the user computing device 120, the vehicle 110 of network 100 of FIG. 1). According to some aspects, the server computing device 130 may be configured not only to receive the operational data from the vehicle 110 but also to process the sensor data and/or to apply the model mismatch and fault detection logic of the present disclosure (e.g., the server computing device 130 may be a quicker and/or more efficient processing resource than the local component 200 of FIG. 2A).

Still referring to FIG. 3A, the server computing device 130 may include a processing device 305, I/O hardware 310, network interface hardware 315, a data storage device 320, and a non-transitory memory component 330. A local interface 300, such as a bus or the like, may interconnect the various components.

The processing device 305, such as a computer processing unit (CPU), may be the central processing unit of the server computing device 130, performing calculations and logic operations to execute a program. The processing device 305, alone or in conjunction with the other components, is an illustrative processing device, computing device, processor, or combination thereof. The processing device 305 may include any processing component configured to receive and execute instructions (such as from the data storage device 320 and/or the memory component 330).

The memory component 330 may be configured as a volatile and/or a nonvolatile computer-readable medium and, as such, may include random access memory 340 (including SRAM, DRAM, and/or other types of random access memory), read only memory (ROM) 345, flash memory, registers, compact discs (CD), digital versatile discs (DVD), and/or other types of storage components. The memory component 330 may include one or more programming instructions thereon that, when executed by the processing device 305, cause the processing device 305 to complete various processes, such as the model mismatch and fault detection logic described herein and the processes described herein with respect to FIG. 4. Still referring to FIG. 3A, the programming instructions stored on the memory component 330 may be embodied as a plurality of software logic modules, where each logic module provides programming instructions for completing one or more tasks, as described in greater detail below with respect to FIG. 3B.

The network interface hardware 315 may include any wired or wireless networking hardware, such as a modem, LAN port, wireless fidelity (Wi-Fi) card, WiMax card, mobile communications hardware, and/or other hardware for communicating with other networks and/or devices. For example, the network interface hardware 315 may provide a communications link between the server computing device 130 and the other components of the network 100 depicted in FIG. 1, including (but not limited to) the vehicle 110.

Still referring to FIG. 3A, the data storage device 320, which may generally be a storage medium, may contain one or more data repositories for storing data that is received (e.g., sensor data, training data, testing data, and/or the like) and/or generated (e.g., PCA model(s), $T^2$ and Q statistics, computations associated with the model mismatch and fault detection logic, and/or the like). According to various aspects, such data may be received from or generated by one or more vehicles 110 and/or a component thereof. The data storage device 320 may be any physical storage medium, including, but not limited to, a hard disk drive (HDD), memory, removable storage, and/or the like. Illustrative data that may be contained within the data storage device 320 is described below with respect to FIG. 3C.

Still referring to FIG. 3A, the I/O hardware 310 may communicate information between the local interface 300 and one or more other components of the server computing device 130. In some embodiments, the I/O hardware 310 may be utilized to transmit one or more commands to the other components of the server computing device 130 based on one or more inputs received from a user.

Figure 3B:
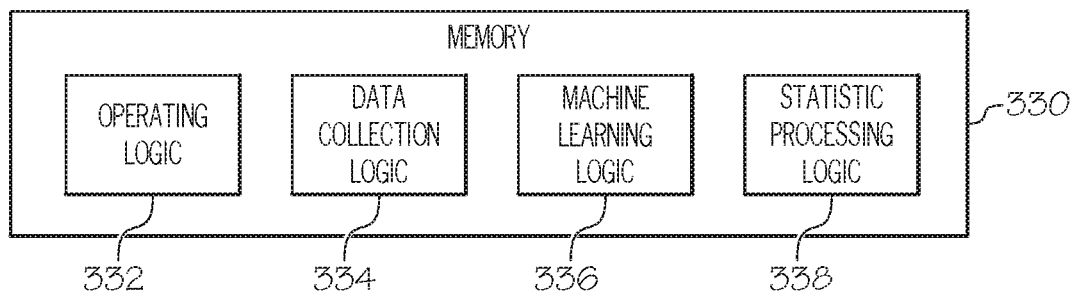
FIG. 3B depicts a block diagram of an illustrative memory component of a server computing device, the memory component containing illustrative logic components according to one or more embodiments shown and described herein.

In some embodiments, the program instructions contained on the memory component 330 may be embodied as a plurality of software modules, where each module provides programming instructions for completing one or more tasks. For example, FIG. 3B schematically depicts the memory component 330 containing illustrative logic components according to one or more embodiments shown and described herein. As shown in FIG. 3B, the memory component 330 may be configured to store various processing logic, such as, for example, operating logic 332, data collection logic 334, machine learning logic 336, and/or statistic processing logic 338 (each of which may be embodied as a computer program, firmware, or hardware, as an example). The operating logic 332 may include an operating system and/or other software for managing components of the server computing device 130 (FIG. 3A). The data collection logic 334 may contain one or more software modules for collecting data (e.g., operational data) from one or more sources (e.g., the one or more sensors 250 depicted in FIG. 2A), converting data, transmitting data, and/or analyzing data, as described in greater detail herein. The machine learning logic 336 may contain one or more software modules for collecting data (e.g., training data, testing data), analyzing the data, and determining information from the data (e.g., PCA model), as described in greater detail herein. The statistic processing logic 338 may contain one or more software modules for determining whether certain received data (e.g. operational data from the vehicle 110 of FIG. 1) is indicative of a model mismatch and/or a fault, as described in greater detail herein.

Figure 3C:
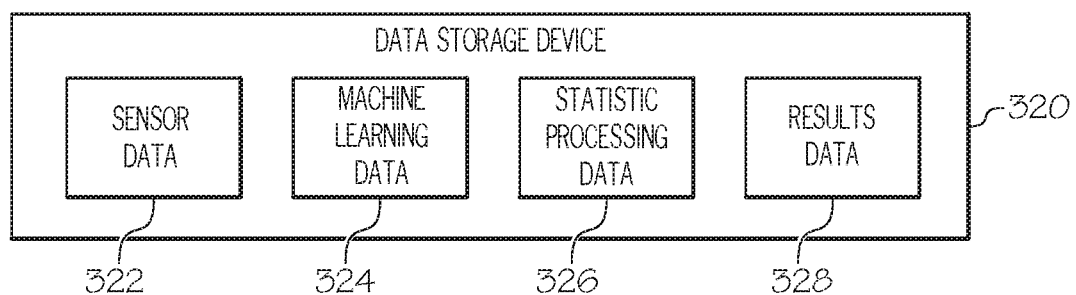
FIG. 3C depicts a block diagram of an illustrative data storage device of a server computing device, the data storage device containing illustrative data components according to one or more embodiments shown and described herein.

FIG. 3C schematically depicts a block diagram of various data contained within a storage device (e.g., the data storage device 320) of the server computing device 130 (FIG. 3A) according to one or more embodiments shown and described herein. As shown in FIG. 3C, the data storage device 320 may include, for example, sensor data 322, machine learning data 324, statistic processing data 326, and/or results data 328. Sensor data 322 may include, for example, data (e.g., from the one or more sensors 250 in FIG. 2A) received and/or transmitted from the vehicle 110 (FIG. 1) and/or a component thereof (e.g., the local component 200 of FIG. 2A) and/or from a plurality of vehicles 110. For example, sensor data 322 may include voltage outputs associated with a throttle position sensor, as described above. The machine learning data 324 may generally be teaching data and/or testing data for machine learning processes. For example, machine learning data 324 may include operational data known to be faulty and/or operational data known to be not faulty, which is usable by machine learning logic 336 to learn when particular situations indicate faulty or not faulty operation. Statistic processing data 326 may generally be data that is generated and/or accessed as a result of processing data received from the one or more sensors 250 (FIG. 2A) of the vehicle 110 (FIG. 1). For example, statistic processing data 326 may include calculated $T^2$ statistics, calculated Q statistics, generated PCA model(s), and/or the like. Results data 328 may be data that corresponds to whether a model mismatch and/or a fault is detected, including time data, location data, transmission logs, and/or the like.

It should be understood that the components illustrated in FIGS. 3A-3C are merely illustrative and are not intended to limit the scope of this disclosure. More specifically, while the components in FIGS. 3A-3C are illustrated as residing within the server computing device 130, this is a nonlimiting example. In some embodiments, one or more of the components may reside external to the server computing device 130. Similarly, as previously described herein, while FIGS. 3A-3C are directed to the server computing device 130, other components such as the user computing device 120 may include similar hardware, software, and/or firmware.

As mentioned above, the various components described with respect to FIGS. 2A-2C and FIGS. 3A-3C may be used to carry out one or more processes and/or provide functionality for receiving sensor data, processing the sensor data, and determining whether the processed sensor data is indicative of a model mismatch and/or a detected fault such that appropriate action can be undertaken.

Figure 4:
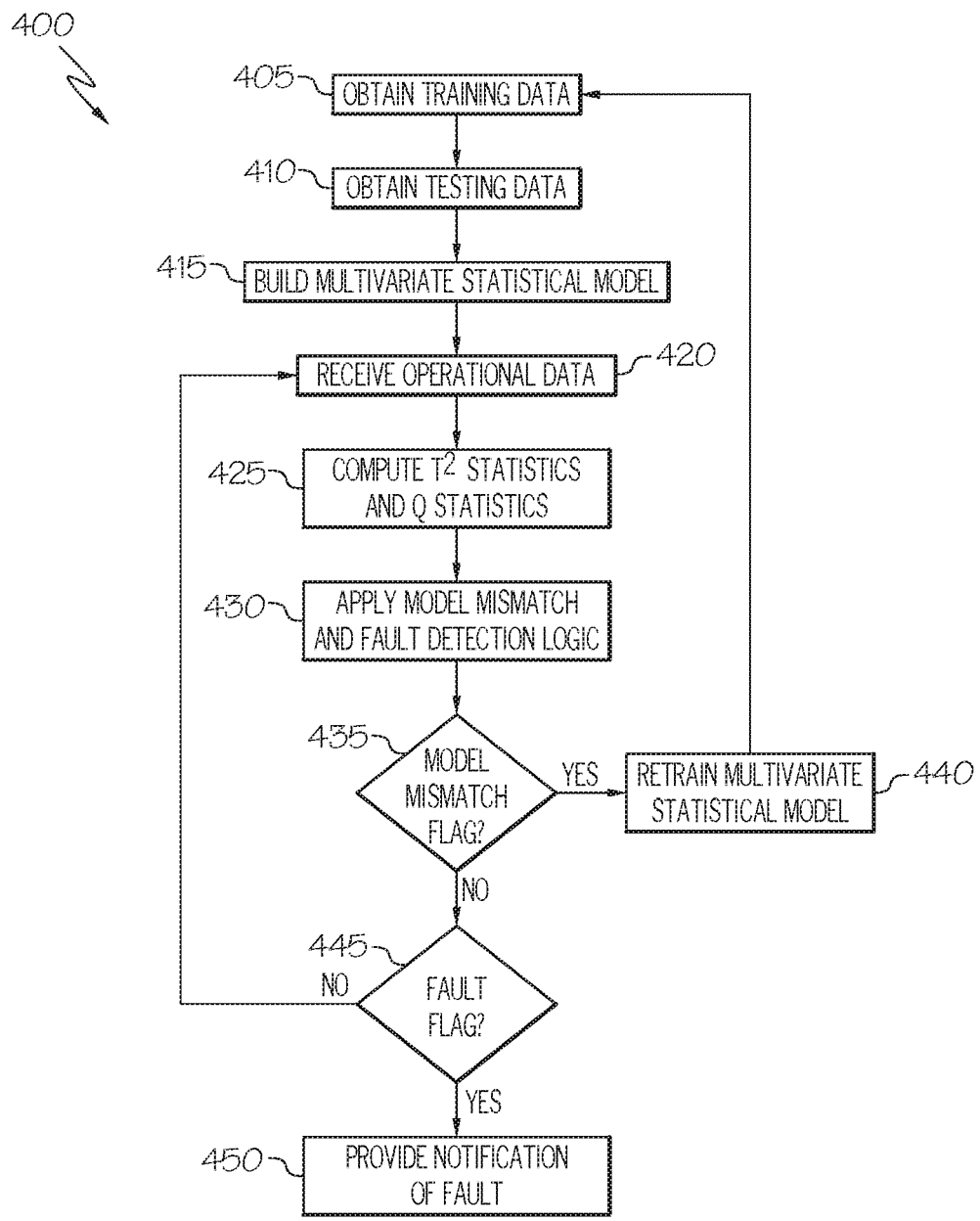
FIG. 4 depicts a flow diagram of an illustrative process carried out by the hardware components of the vehicle of FIG. 2A and/or of the server computing device of FIG. 3A according to one or more embodiments shown and described herein.

FIG. 4 depicts a flow diagram of an illustrative process carried out by one or more of the components as described herein. According to various embodiments, all steps of the process depicted in FIG. 4 may be performed by components of the vehicle (e.g., FIGS. 2A-2C). In such aspects, the analysis and detection of a fault or a model mismatch can be performed on-vehicle and in real-time. As such, communication lags (e.g., due to upload and/or download speeds, connectivity issues, and/or the like) can be avoided. According to other embodiments, all steps of the process depicted in FIG. 4 may be performed by components of the server computing device 130 (e.g., FIGS. 3A-3C). According to further embodiments, the steps of the process depicted in FIG. 4 may be distributed between the components of the vehicle 110 and the components of the server computing device 130. According to some aspects, a distributed process may occur when a connection with the computer network 105 is readily and reliably available (e.g., real-time or near real-time communications, no or negligible communication lags, and/or the like). For example, a processing device 305 of the server computing device 130 (FIG. 3A) may have a faster data/instruction processing speed than a processing device 205 of the local component 200 of the vehicle 110 (FIG. 2A). In such an example, computationally intensive aspects (e.g., machine learning, processing operational data associated with a plurality of vehicles, and/or the like) may be assigned to the server computing device to realize computational efficiencies. According to yet further embodiments, steps of the process depicted in FIG. 4 may be concurrently processed by the components of the vehicle 110 and the components of the server computing device 130.

Referring to FIG. 4, training data may be received at block 405 and testing data may be received at block 410. The training data and the testing data may generally be the data that is received from the one or more sensors (FIG. 2A) positioned on, integrated with, positioned in line with, or positioned adjacent to one or more electronic devices (e.g., power converters, semiconductor devices, and/or the like) to be measured and/or monitored. As such, the training data and the testing data may be collectively referred to herein as sensed data (e.g., operational data). Training data may generally refer to data that is used for the purposes of creating and/or retraining a machine learning model (e.g., a PCA model). Testing data may generally refer to data that is used for the purposes of testing the machine learning model (e.g., the PCA model) to assess is predictive ability. For example, testing data may be data known to be associated with a faulty electronic device. Such data may be applied to the machine learning model to assess whether the machine learning model can detect the fault. At block 405, if the process is being performed by the local component 200 of the vehicle 110, the training data and/or testing data may be received directly from the one or more sensors. Alternatively, at block 405, if the process is being performed at least in part by the server computing device 130, the training data and/or testing data may be received from the vehicle 110 via the computer network 105 (FIG. 1). In such an aspect, the training data and/or testing data may be received from a plurality of vehicles 110 in the network 100.

In some embodiments, the training data and the testing data may generally be the same data. That is, the data that is received from the one or more sensors is split up, with one portion of the data being designated as the training data and the other portion being designated as the testing data. For example, about 60% of the data, about 70% of the data, about 80% of the data, about 90% of the data, or the like may be designated as training data and the remaining portion of the data designated as the testing data. Other percentages should generally be understood without departing from the scope of the present disclosure.

At block 415, the local component 200 of the vehicle 110 and/or the server computing device 130 may build or retrain a machine learning model based on the received training data. According to various aspects, the machine learning model may be referred to as a multivariate statistical model. In such aspects, the local component 200 of the vehicle 110 and/or the server computing device 130 may generate statistics (e.g., mean, variance, covariance, and/or the like) from the training data and use those statistics to build a multivariate statistical model for each of one or more electronic device of interest. According to various aspects, the multivariate statistical model may utilize Principal Component Analysis (PCA) to transform an M-dimensional variable space to an N-dimensional space of mutually orthogonal principal components. PCA calculates a set of M eigenvectors and M eigenvalues (e.g., each eigenvector transforms process variable data to a respective dimension of the principal component space, each eigenvalue is proportional to an amount of variance represented by its corresponding eigenvector) and then simplifies the principal component space by retaining N eigenvectors corresponding to the N largest eigenvalues in the output PCA model. Notably, the number "N" of principal components represents a tradeoff between a PCA model that explains less of the data variance (e.g., smaller N) and a PCA model that explains more of the data variance (e.g., larger N). Further details regarding PCA are generally understood and beyond the scope of the present disclosure.

At block 420, the local component 200 of the vehicle 110 and/or the server computing device 130 (e.g., from the vehicle 110 via the computer network 105) may receive operational data (e.g., in real-time or near real-time) from the one or more sensors (e.g., sensors 250 of FIG. 2A). In light of FIGS. 5A and 6A, the operational data may be received over a continuous time period (e.g., a period of hours and/or the like).

Referring to block 425, each multivariate statistical model (e.g., PCA model) may be associated with one or more model metrics. According to various aspects of the present disclosure, the one or more model metric may include Hotelling's $T^2$ and squared prediction error Q. Each model metric ($T^2$, Q, and/or the like) may correspond to a unique mathematical method of estimating a probability that the process data (e.g., current operational data) being monitored has the same (or not statistically significant different) statistics (e.g., mean, variance, covariance, and/or the like) as the training data used to build the multivariate statistical model. Stated differently, each model metric ($T^2$, Q, and/or the like) is a scalar number the value of which represents a magnitude of deviation between the statistical characteristics of process data (e.g., operational data) collected during actual process monitoring and the statistical characteristics predicted by the multivariate statistical model (e.g., the PCA model). Notably, each model metric ($T^2$, Q, and/or the like) may be associated with a respective threshold value (e.g., $T^2_{threshold}$, $Q_{threshold}$, and/or the like) and a fault may be detected and/or diagnosed if a currently calculated model metric exceeds its associated threshold value (e.g. $T^2 > T^2_{threshold}$, $Q > Q_{threshold}$). Details regarding the computation of the one or more model metric ($T^2$ and/or Q) is generally understood (e.g., via conventional statistical algorithms) and beyond the scope of the present disclosure. Accordingly, at block 425, the local component 200 of the vehicle 110 and/or the server computing device 130 may compute the $T^2$ statistics and Q statistics associated with the received operational data over the continuous time period.

At block 430, the local component 200 of the vehicle 110 and/or the server computing device 130 may apply or execute the model mismatch and fault detection logic of the present disclosure. The pseudo-code in Table 1 below illustrates one example implementation of the model mismatch and fault detection logic, as described herein.

TABLE 1

Example Pseudo-Code-Model Mismatch and
Fault Detection/Signaling Logic counter$_{T^2}$ = 0, A$_{T^2}$ = 0
counter$_Q$ = 0, A$_Q$ = 0
function modelMismatch_Fault
(Q, $T^2$, $T^2_{threshold}$, $Q_{threshold}$, $N_{prior}$, $C_{T^2}$, $C_Q$)
 if $T^2$ > $T^2_{threshold}$ then
  counter$_{T^2}$ += 1

$$A_{T^2} = \min\left\{1, A_{T^2} + \frac{1}{N_{prior}}\right\}$$

TABLE 1-continued

Example Pseudo-Code-Model Mismatch and
Fault Detection/Signaling Logic else
 counter$_{T^2}$ = 0

$$A_{T^2} = \max\left\{0, A_{T^2} - \frac{1}{N_{prior}}\right\}$$

end if
if Q > $Q_{threshold}$ then
 counter$_Q$ += 1

$$A_Q = \min\left\{1, A_Q + \frac{1}{N_{prior}}\right\}$$

else
 counter$_Q$ = 0

$$A_Q = \max\left\{0, A_Q - \frac{1}{N_{prior}}\right\}$$

end if $$p\_mismatch = \left(1 - \left(1 - A_Q^{counter_Q+1}\right) * C_Q\right)^{\frac{1}{counter_Q+1}}$$

$$p\_fault = \left(1 - \left(1 - A_{T^2}^{counter_{T^2}+1}\right) * C_{T^2}\right)^{\frac{1}{counter_{T^2}+1}}$$

Mismatch$_{flag}$ = p_mismatch > p_mismatch_threshold
Fault$_{flag}$ = p_fault > p_fault_threshold ˆ ~ Mismatch$_{flag}$
return Mismatch$_{flag}$, Fault$_{flag}$
end function According to various embodiments, in line with Table 1 above, the model mismatch and fault detection logic may be a function of variables including Q, $T^2$, $Q_{threshold}$, $T^2_{threshold}$, $N_{prior}$, $C_{T^2}$, and $C_Q$, where Q is the squared prediction error model metric discussed herein, $T^2$ is the Hotelling's $T^2$ model metric discussed herein, $Q_{threshold}$ is a threshold value for Q, $T^2_{threshold}$ is a threshold value for $T^2$, $C_{T^2}$ is a degree of confidence for $T^2$, $C_Q$ is a degree of confidence for Q, and $N_{prior}$ is a lower bound for a number of prior observations (e.g., runs, cycles, iterations, and/or the like). According to various aspects, $N_{prior} \geq \log(1-\max(C_{T^2}, C_Q))/\log(R_0)$, where $R_0$ is a lower bound on a probability (e.g., probability of fault or probability of model mismatch, as discussed herein). Here, according to various embodiments, $C_{T^2}$, $C_Q$, and $R_0$ may be chosen to equal 0.99. As such, according to various aspects of the present disclosure, $N_{prior}$ may be chosen to equal a value that meets such constraints (e.g., $N_{prior} \geq 600$).

Further in view of Table 1, the model mismatch and fault detection logic may set, as initial values:

$$\text{counter}_{T^2}=0, A_{T^2}=0 \qquad (1)$$

$$\text{counter}_Q=0, A_Q=0 \qquad (2)$$

where counter$_{T^2}$ is a counter that counts a number of times the calculated $T^2$ statistic exceeds the $T^2_{threshold}$, counter$_Q$ is a counter that counts a number of times the calculated Q statistic exceeds the $Q_{threshold}$, $A_{T^2}$ is a prior probability of fault associated with the $T^2$ statistic, and $A_Q$ is a prior probability of model mismatch associated with the Q statistic.

Within this backdrop, the local component 200 of the vehicle 110 and/or the server computing device 130 may compare each computed $T^2$ statistic to the $T^2_{threshold}$ and update $A_{T^2}$ and counter$_{T^2}$ as follows if $T^2 > T^2_{threshold}$ then $$\text{counter}_{T^2} \mathrel{+}= 1, \quad (3a)$$

$$A_{T^2} = \min\left\{1, A_{T^2} + \frac{1}{N_{prior}}\right\} \quad (3b)$$

else $$\text{counter}_{T^2} = 0, \quad (4a)$$

$$A_{T^2} = \max\left\{0, A_{T^2} - \frac{1}{N_{prior}}\right\} \quad (4b)$$

Accordingly, with each computed $T^2$ statistic greater than the $T^2_{threshold}$, the prior probability of fault associated with $T^2$ (e.g., $A_{T^2}$) is increased by a fraction $$\left(\text{e.g., } \frac{1}{N_{prior}}\right)$$

based on the number of prior observations (e.g., for $N_{prior} \geq 600$). Otherwise, with each computed $T^2$ statistic less than or equal to the $T^2_{threshold}$, the prior probability of fault associated with $T^2$ (e.g., $A_{T^2}$) is decreased by a fraction $$\left(\text{e.g., } \frac{1}{N_{prior}}\right)$$

based on the number of prior observations (e.g., for $N_{prior} \geq 600$). According to such aspects, the prior probability of fault associated with $T^2$ (e.g., $A_{T^2}$) is updated, with each computation of $T^2$, based in part on prior/past observations.

The local component 200 of the vehicle 110 and/or the server computing device 130 may then calculate a probability of fault as follows:

$$\text{p\_fault} = \left(1 - \left(1 - A_{T^2}^{\text{counter}_{T^2}+1}\right) * C_{T^2}\right)^{\frac{1}{\text{counter}_{T^2}+1}} \quad (5)$$

where $A_{T^2}$ has been determined via Equation 3b or Equation 4b.

More specifically, Equation 5 may be derived using the following probability equation:

$$R \geq R_0 = (1 - (1 - A^{n+1}) * C)^{\frac{1}{n+1}} \quad (6)$$

where R is a probability (e.g., probability of fault, as discussed herein), $R_0$ is a lower bound on that probability (e.g., lower bound on the probability of fault), A is the prior probability (e.g., prior probability of fault), C is a confidence (e.g., confidence associated with $T^2$), and n is the number of consecutive observations above threshold (e.g., the number of consecutive observations of $T^2$ above $T^2_{threshold}$).

Similarly, the local component 200 of the vehicle 110 and/or the server computing device 130 may compare each computed Q statistic to the $Q_{threshold}$ and update $A_Q$ and $\text{counter}_Q$ as follows:

if $Q > Q_{threshold}$ then $$\text{counter}_Q \mathrel{+}= 1, \quad (7a)$$

$$A_Q = \min\left\{1, A_Q + \frac{1}{N_{prior}}\right\} \quad (7b)$$

else $$\text{counter}_Q = 0, \quad (8a)$$

$$A_Q = \max\left\{0, A_Q - \frac{1}{N_{prior}}\right\} \quad (8b)$$

Accordingly, with each computed Q statistic greater than the $Q_{threshold}$, the prior probability of model mismatch associated with Q (e.g., $A_Q$) is increased by a fraction $$\left(\text{e.g., } \frac{1}{N_{prior}}\right)$$

based on the number of prior observations (e.g., for $N_{prior} \geq 600$). Otherwise, with each computed Q statistic less than or equal to the $Q_{threshold}$, the prior probability of model mismatch associated with Q (e.g., $A_Q$) is decreased by a fraction $$\left(\text{e.g., } \frac{1}{N_{prior}}\right)$$

based on the number of prior observations (e.g., for $N_{prior} \geq 600$). According to such aspects, the prior probability of model mismatch associated with Q (e.g., $A_Q$) is updated, with each computation of Q, based in part on prior/past observations.

The local component 200 of the vehicle 110 and/or the server computing device 130 may then calculate a probability of mismatch as follows:

$$\text{p\_mismatch} = \left(1 - \left(1 - A_Q^{\text{counter}_Q+1}\right) * C_Q\right)^{\frac{1}{\text{counter}_Q+1}} \quad (9)$$

where $A_Q$ has been determined via Equation 7b or Equation 8b.

Similar to above, Equation 9 may be derived using Equation 6, where R is a probability (e.g., probability of model mismatch, as discussed herein), $R_0$ is a lower bound on that probability (e.g., lower bound on the probability of model mismatch), A is the prior probability (e.g., prior probability of model mismatch), C is a confidence (e.g., confidence associated with Q), and n is the number of consecutive observations above threshold (e.g., the number of consecutive observations of Q above $Q_{threshold}$).

At block 435, the local component 200 of the vehicle 110 and/or the server computing device 130 may determine whether to flag a model mismatch using a probability of mismatch threshold (e.g., p_mismatch_threshold) as follows:

$$\text{Mismatch}_{flag} = \text{p\_mismatch} > \text{p\_mismatch\_threshold} \quad (10)$$

where p_mismatch has been determined via Equation 9.

According to such aspects, if a model mismatch is flagged, the local component 200 of the vehicle 110 and/or the server computing device 130 may retrain the multivariate statistical model (e.g., PCA model) at block 440. According to various aspects, retraining the multivariate statistical model may include obtaining new training data and new testing data at block 405 and block 410 respectively and building a new and/or updated multivariate statistical model (e.g., a new PCA model) at block 415 as previously described herein.

According to other aspects, if a model mismatch is not flagged, the local component 200 of the vehicle 110 and/or the server computing device 130 may determine whether to flag a fault at block 445 using a probability of fault threshold (e.g., p_fault_threshold) as follows:

$$\text{Fault}_{flag} = p\_fault > p\_fault\_threshold \quad (11)$$

where p_fault has been determined via Equation 5.

According to such aspects, if a fault is not flagged, the local component 200 of the vehicle 110 and/or the server computing device 130 may return to block 420 and continue to receive and process operational data over the continuous time period as described.

According to other aspects, if a fault is flagged, the local component 200 of the vehicle 110 and/or the server computing device 130 may provide a notification of the fault or probable fault at block 450. According to various aspects, a vehicle user may be notified of the fault or probable fault via an interface in the vehicle 110 as described above. According to other aspects, other networked components (e.g., user computing device 120 and/or server computing device 130) may be notified (e.g., via the computer network 105) of the fault or probable fault.

As described above, calculated $T^2$ statistics and Q statistics are compared to their respective thresholds, $T^2_{threshold}$ and $Q_{threshold}$, over time. If the $T^2$ statistic for a current iteration exceeds the threshold $T^2_{threshold}$ then the counter (counter$_{T^2}$) of consecutive observations above threshold is incremented (e.g., Equation 3a above) and the probability of fault is updated (e.g., Equation 3b and Equation 5 above). Alternatively, if the $T^2$ statistic for the current iteration is equal to or below threshold, the counter (counter$_{T^2}$) is reset to zero (e.g., Equation 4a above) and the probability of fault is updated (e.g., Equation 4b and Equation 5 above). Similarly, if the Q statistic for the current iteration exceeds the threshold $Q_{threshold}$, then the counter (counter Q) of consecutive observations above threshold is incremented (e.g., Equation 7a above) and the probability of model mismatch is updated (e.g., Equation 7b and Equation 9 above). Alternatively, if the Q statistic for the current iteration is equal to or below the threshold $Q_{threshold}$, the counter (counter Q) is reset to zero (e.g., Equation 8a above) and the probability of model mismatch is updated (e.g., Equation 8b and Equation 9 above).

According to such aspects, at each iteration, each of the probability of fault and the probability of model mismatch are computed (e.g., Equation 5 and Equation 9 above) and may be compared to a 99% threshold. A model mismatch may be declared if the probability of model mismatch exceeds a 99% threshold (e.g., p_mismatch_threshold). A fault may be declared if a model mismatch is not simultaneously declared and the probability of fault exceeds a 99% threshold (e.g., p_fault_threshold).

According to other aspects, at each iteration, each of the probability of fault and the probability of model mismatch are computed (e.g., Equation 5 and Equation 9 above) and may be compared to a predetermined threshold.

In some aspects, the predetermined threshold may be greater than 99% (e.g., relatively less conservative fault detection and/or relatively less aggressive model mismatch detection, more acceptable of probable device failure than a false alarm) or less than 99% (e.g., relatively more conservative fault detection and/or relatively more aggressive model mismatch detection, more acceptable of a false alarm than probable device failure). In one example, the predetermined threshold may be 99.5% in lieu of 99%. In such an example, the local component 200 of the vehicle 110 and/or the server computing device 130 may not only be relatively less aggressive in retraining the multivariate statistical model (e.g., PCA model) at block 440 of FIG. 4 (e.g., may retrain less, more consecutive instances of $Q > Q_{threshold}$ to trigger a retraining), but also be relatively less conservative in issuing a notification of fault at block 450 of FIG. 4 (e.g., may issue less notifications of fault, more consecutive instances of $T^2 > T^2_{threshold}$ to trigger a fault notification). In another example, the predetermined threshold may be 98.5% in lieu of 99%. In such an example, the local component 200 of the vehicle 110 and/or the server computing device 130 may not only be relatively more aggressive in retraining the multivariate statistical model (e.g., PCA model) at block 440 of FIG. 4 (e.g., may retrain more, less consecutive instances of $Q > Q_{threshold}$ to trigger a retraining), but also be relatively more conservative in issuing a notification of fault at block 450 of FIG. 4 (e.g., may issue more notifications of fault, less consecutive instances of $T^2 > T^2_{threshold}$ to trigger a fault notification). Accordingly, various embodiments of the present disclosure may utilize a predetermined threshold greater than 99% to further suppress or reject a false alarm caused by a short excursion (e.g., a deviation from a regular pattern, path, or level of operation) that is not attributable to faulty operation of a device.

In other aspects, the predetermined threshold may be different for the probability of model mismatch and the probability of fault. In one example, the probability of model mismatch threshold (e.g., p_mismatch_threshold) may be less than 99% (e.g., relatively more aggressive model mismatch detection, may retrain more, less consecutive instances of $Q > Q_{threshold}$ to trigger a retraining) and the probability of fault threshold (e.g., p_fault_threshold) may be greater than 99% (e.g., relatively less conservative fault detection, may issue less notifications of fault, more consecutive instances of $T^2 > T^2_{threshold}$ to trigger a fault notification). In such an example, the local component 200 of the vehicle 110 and/or the server computing device 130 may retrain more and may issue less notifications of fault. In another example, the probability of model mismatch threshold (e.g., p_mismatch_threshold) may be greater than 99% (e.g., relatively less aggressive model mismatch detection, may retrain less, more consecutive instances of $Q > Q_{threshold}$ to trigger a retraining) and the probability of fault threshold (e.g., p_fault_threshold) may be less than 99% (e.g., relatively more conservative fault detection, may issue more notifications of fault, less consecutive instances of $T^2 > T^2_{threshold}$ to trigger a fault notification). In such an example, the local component 200 of the vehicle 110 and/or the server computing device 130 may retrain less and may issue more notifications of fault. Accordingly, various embodiments of the present disclosure may utilize a probability of model mismatch threshold (e.g., p_mismatch_threshold) less than 99% and a probability of fault threshold (e.g., p_fault_threshold) greater than 99% to further suppress or reject a false alarm caused by a short excursion (e.g., a deviation from a regular pattern, path, or level of operation) that is not attributable to faulty operation of a device.

Within this backdrop, according to various embodiments of the present disclosure, the probability of model mismatch threshold (e.g., p_mismatch_threshold in Equation 10 above) and/or the probability of fault threshold (e.g., p_fault_threshold in Equation 11 above) of the model mismatch and fault detection logic, described herein, may be dynamically modified to further suppress or reject a false alarm caused by a short excursion (e.g., a deviation from a regular pattern, path, or level of operation) that is not attributable to faulty operation of a device, as described above. More specifically, according to various aspects, the local component 200 of the vehicle 110 and/or the server computing device 130 may dynamically modify the probability of model mismatch threshold (e.g., p_mismatch_threshold) and/or the probability of fault threshold (e.g., p_fault_threshold) using a predetermined group of tiered thresholds. In one example, the predetermined group of tiered thresholds may include a first tier of 98.5%, a second tier of 99%, and a third tier of 99.5%. It should be understood that various other tiered thresholds may be used within the spirit and scope of the present disclosure. In such an aspect, the local component 200 of the vehicle 110 and/or the server computing device 130 may monitor when the p_mismatch and/or the p_fault (e.g., as updated via the model mismatch and fault detection logic described herein) exceeds or will exceed the first tiered threshold. In response, the local component 200 of the vehicle 110 and/or the server computing device 130 may dynamically modify that exceeded first tiered threshold (e.g., 98.5%) to the second tiered threshold (e.g., 99%) to avoid triggering a retraining and/or a fault. For example, the p_mismatch_threshold may be dynamically modified to 99% from 98.5% when p_mismatch, updated via the model mismatch and fault detection logic described herein, exceeds or will exceed 98.5%. The p_fault_threshold may similarly be dynamically modified to 99% from 98.5% when p_fault, updated via the model mismatch and fault detection logic described herein, exceeds or will exceed 98.5%. The p_mismatch_threshold and/or the p_fault_threshold may be similarly dynamically modified from the second tiered threshold (e.g., 99%) to the third tiered threshold (e.g., 99.5%) of the predetermined group of tiered thresholds.

Furthermore, each tier of a predetermined group of tiered thresholds may be associated with a notification level. In one example, the first tier (e.g., 98.5%) may be associated with a first notification level (e.g., a yellow notice interface light, and/or the like), the second tier (e.g., 99%) may be associated with a second notification level (e.g., an orange caution interface light, and/or the like), and the third tier (e.g., 99.5%) may be associated with a third notification level (e.g., a red warning interface light, and/or the like). It should be understood that other notification levels may be used within the spirit and scope of the present disclosure. In such an example, the local component 200 of the vehicle 110 and/or the server computing device 130 may, in response to the p_mismatch and/or the p_fault (e.g., as updated via the model mismatch and fault detection logic described herein) exceeding a tiered threshold (e.g., 98.5%, 99%, 99.5%, and/or the like) provide its associated notification (e.g., yellow notice interface light, orange caution interface light, red warning interface light, respectively) to the vehicle user and/or a networked component, as described herein.

According to various aspects, Equation 6 above may be utilized to determine an exact number (e.g., $n_{T^2 critical}$) of consecutive observations of $T^2$ above $T^2_{threshold}$ to trigger a probability of fault (e.g., p_fault). As discussed herein, Equation 6 corresponds to observing C (e.g., 0.99) of observations above threshold in a chosen bin size (e.g., $N_{prior} \geq \log(1-\max(C_{T^2}, C_Q))/\log(R_0)$, where Ro is a lower bound on a probability, and where $C_{T^2}$, $C_Q$, and $R_0$ may be chosen to equal 0.99). Accordingly, "n" in Equation 6 may substituted with $n_{T^2 critical} = \log(1-C_{T^2})/\log(R_0)$ to ensure being able to signal a fault when the probability of fault (e.g., p_fault) is greater than the lower bound on the probability of fault $R_0$ with confidence $C_{T^2}$.

In this vein, an exact number of consecutive observations of $T^2$ above $T^2_{threshold}$ to trigger a probability of fault (e.g., p_fault) may be calculated/approximated as the iterative solution of Equation 12 below rounded to the nearest integer.

$$x_{k+1} = \log(1-C_{T^2}+C_{T^2}A_{T^2}^{x_k+1})/\log(R_0) \quad (12)$$

Similarly, Equation 6 above may be utilized to determine an exact number (e.g., $n_{Qcritical}$) of consecutive observations of Q above $Q_{threshold}$ to trigger a probability of model mismatch (e.g., p_mismatch). Again, similar to above, "n" in Equation 6 may be substituted with $n_{Qcritical} = \log(1-C_Q)/\log(R_0)$ to ensure being able to signal a model mismatch when the probability of model mismatch (e.g. p_mismatch) is greater than the lower bound on the probability of model mismatch $R_0$ with confidence $C_Q$.

In this vein, an exact number of consecutive observations of Q above $Q_{threshold}$ to trigger a probability of model mismatch (e.g., p_mismatch) may be calculated/approximated as the iterative solution of Equation 13 below rounded to the nearest integer.

$$x_{k+1} = \log(1-C_Q+C_Q A_Q^{x_k+1})/\log(R_0) \quad (13)$$

Table 2 below illustrates exact numbers of consecutive observations above threshold (e.g., $n_{T^2 critical}$, $n_{Qcritical}$) iteratively calculated using Equations 12 and 13 above to trigger a probability of fault and a probability of model mismatch, respectively. Notably, if $R_0$ is chosen to equal $C_{T^2}$ in Equation 12, then $A_{T^2}$ would be less than $C_{T^2}$. Furthermore, a bin size equal to or greater than $n_{T^2 critical}$ would ensure being able to signal a fault when the probability of fault (e.g., p_fault) is greater than the lower bound on the probability of fault $R_0$ with confidence $C_{T^2}$. A bin size smaller than $n_{T^2 critical}$ would be an insufficient number of consecutive observations of $T^2$ above $T^2_{threshold}$ to signal a fault. Similarly, if $R_0$ is chosen to equal $C_Q$ in Equation 13, then $A_Q$ would be less than $C_Q$. Furthermore, a bin size equal to or greater than $n_{Qcritical}$ would ensure being able to signal a model mismatch when the probability of model mismatch (e.g., p_mismatch) is greater than the lower bound on the probability of model mismatch $R_0$ with confidence $C_Q$. A bin size smaller than $n_{Qcritical}$ would be an insufficient number of consecutive observations of Q above $Q_{threshold}$ to signal a model mismatch.

TABLE 2

| $A_{T^2}, A_Q$ | 0.50 | 0.50 | 0.50 | 0.50 | 0.50 | 0.50 | 0.50 | 0.50 | 0.50 |
|---|---|---|---|---|---|---|---|---|---|
| $C_{T^2}, C_Q$ | 0.50 | 0.55 | 0.60 | 0.65 | 0.70 | 0.75 | 0.80 | 0.85 | 0.90 |
| $n_{T^2 critical}, n_{Qcritical}$ | 68 | 79 | 91 | 104 | 119 | 137 | 160 | 188 | 229 |

Figure 5A:
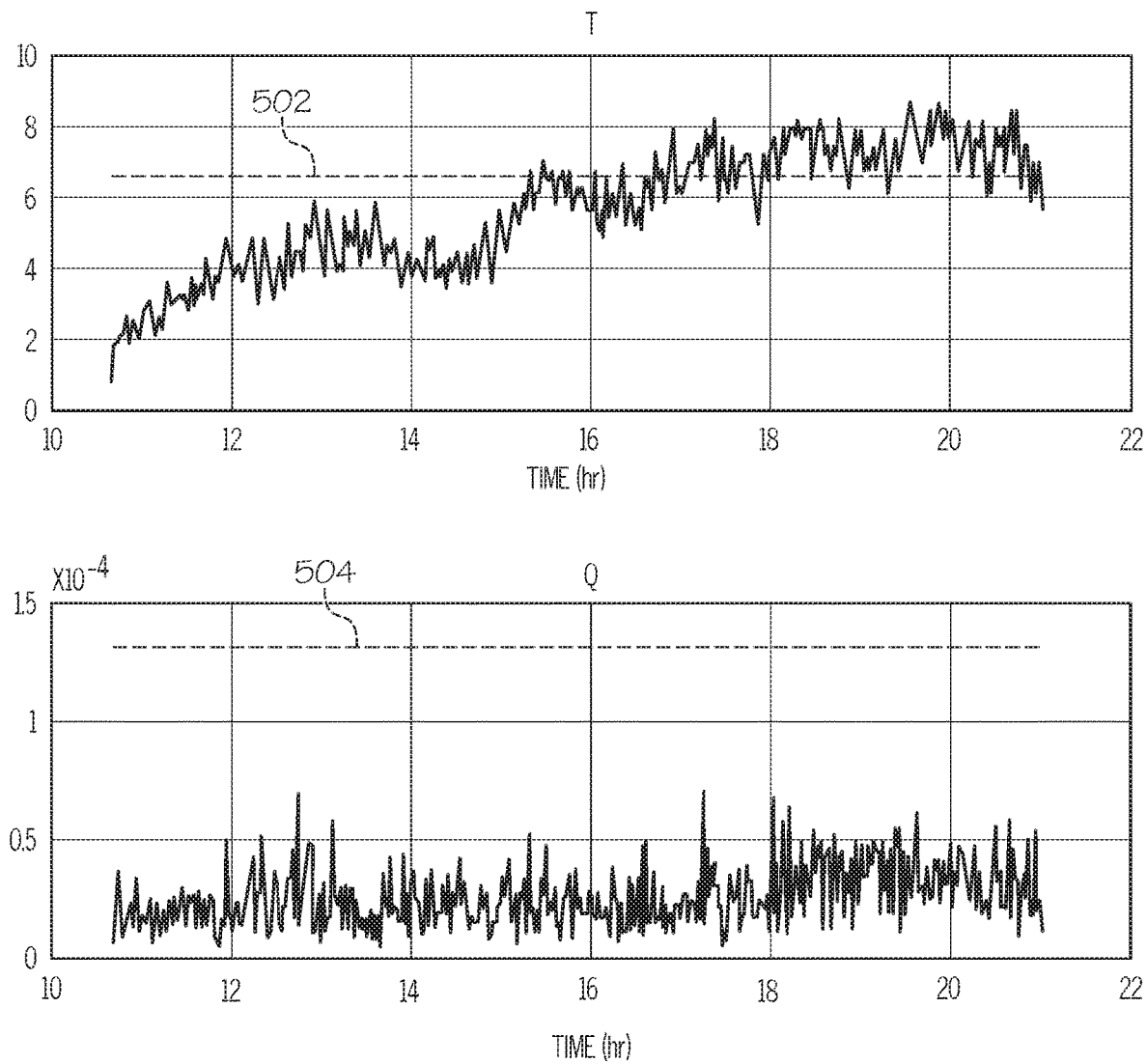
FIG. 5A graphically depicts an illustrative $T^2$ statistical plot and an illustrative Q statistical plot based on continuous operational data associated with a known faulty electronic device over a same period of time according to one or more embodiments shown and described herein.
Figure 5B:
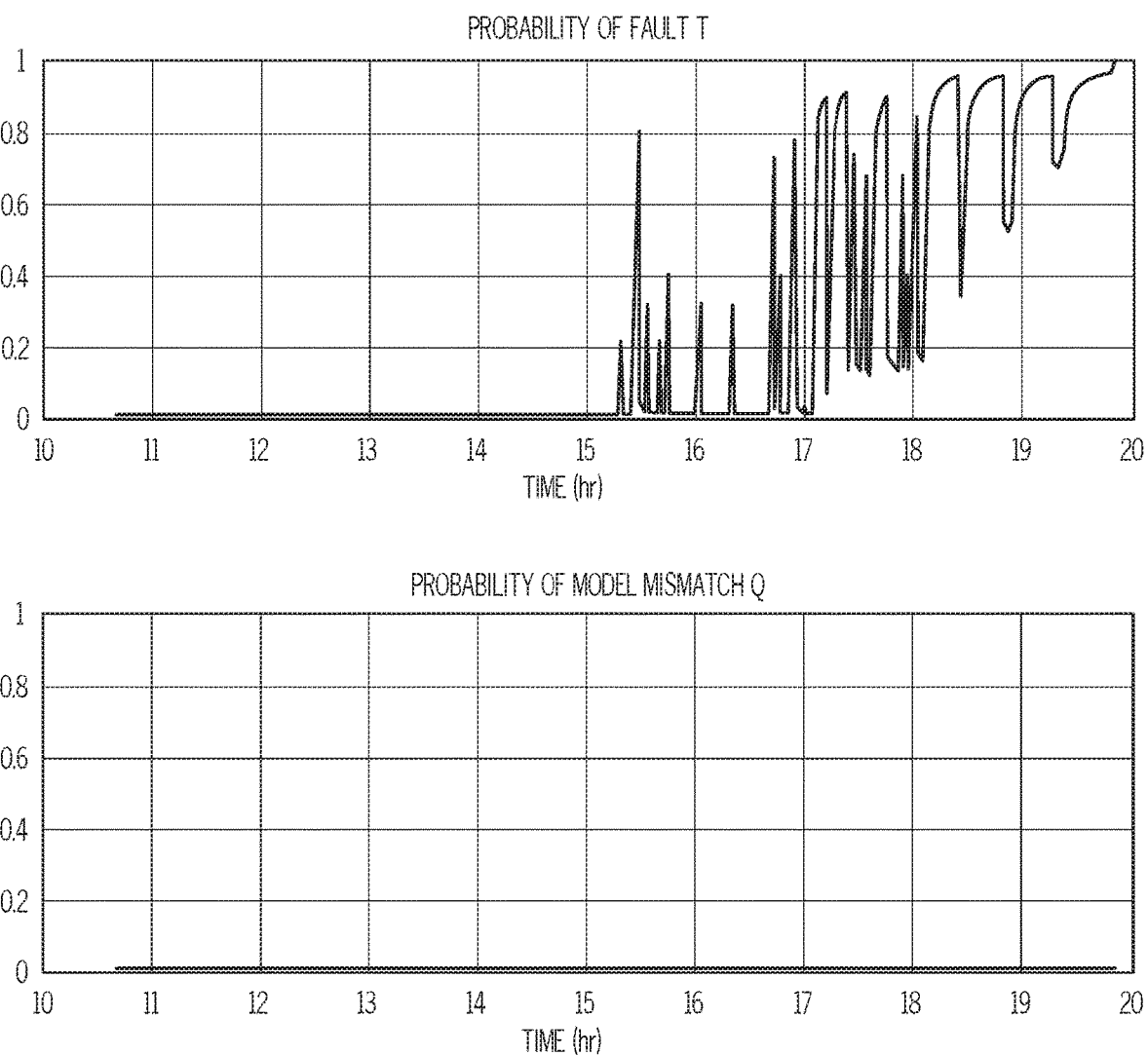
FIG. 5B graphically depicts an illustrative probability of fault based on the $T^2$ statistical plot of FIG. 5A and an illustrative probability of model mismatch based on the Q statistical plot of FIG. 5A according to one or more embodiments shown and described herein.

FIG. 5A graphically depicts an illustrative $T^2$ statistical plot and an illustrative Q statistical plot based on continuous operational data associated with a known faulty electronic device over a same period of time according to various aspects of the present disclosure. FIG. 5B graphically depicts an illustrative probability of fault (e.g., p_fault) based on the $T^2$ statistical plot of FIG. 5A and an illustrative probability of model mismatch (e.g., p_mismatch) based on the Q statistical plot of FIG. 5A according to various aspects of the present disclosure.

Figure 6A:
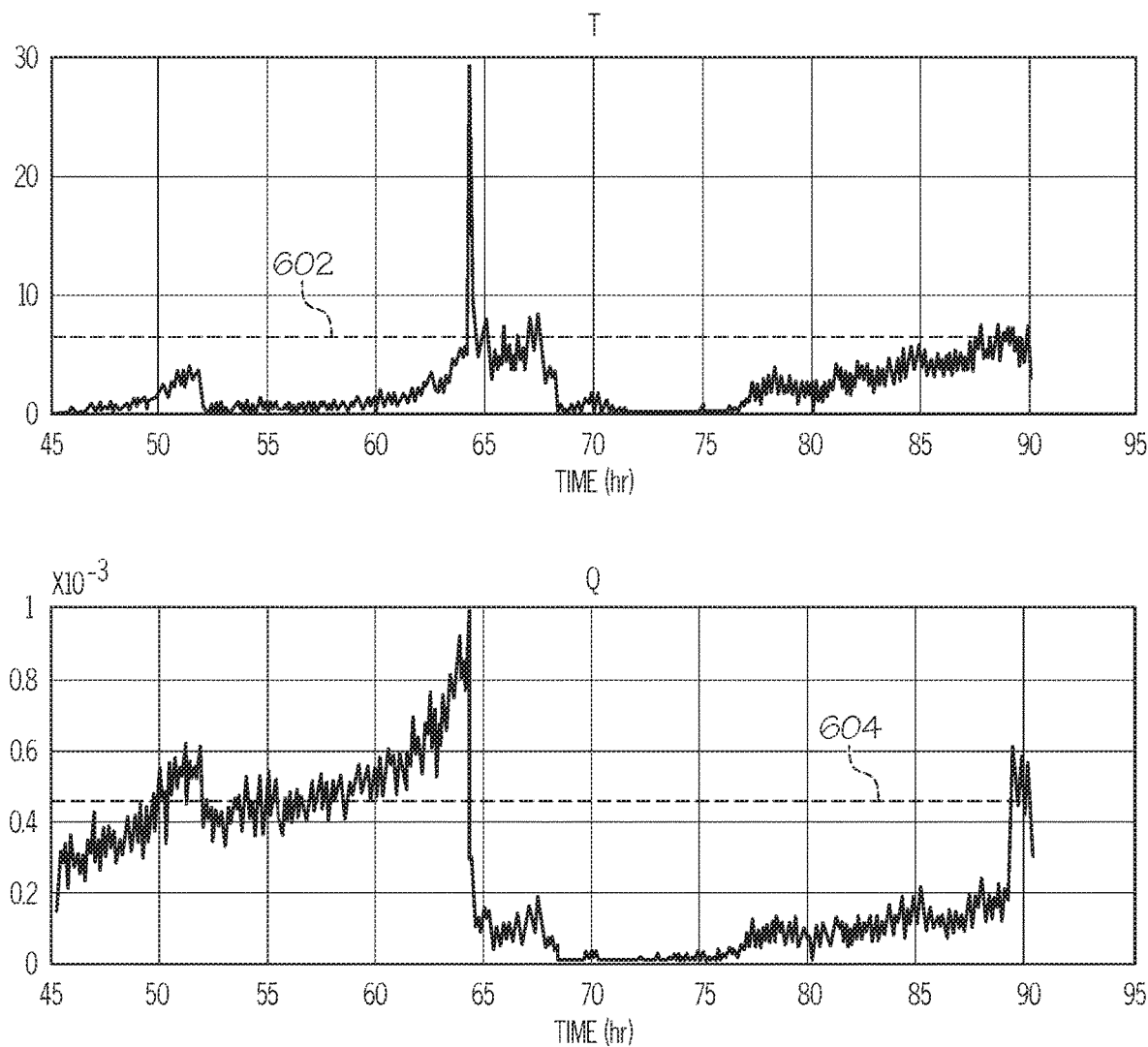
FIG. 6A graphically depicts an illustrative $T^2$ statistical plot and an illustrative Q statistical plot based on continuous operational data associated with a non-faulty electronic device over a same period of time according to one or more embodiments shown and described herein.
Figure 6B:
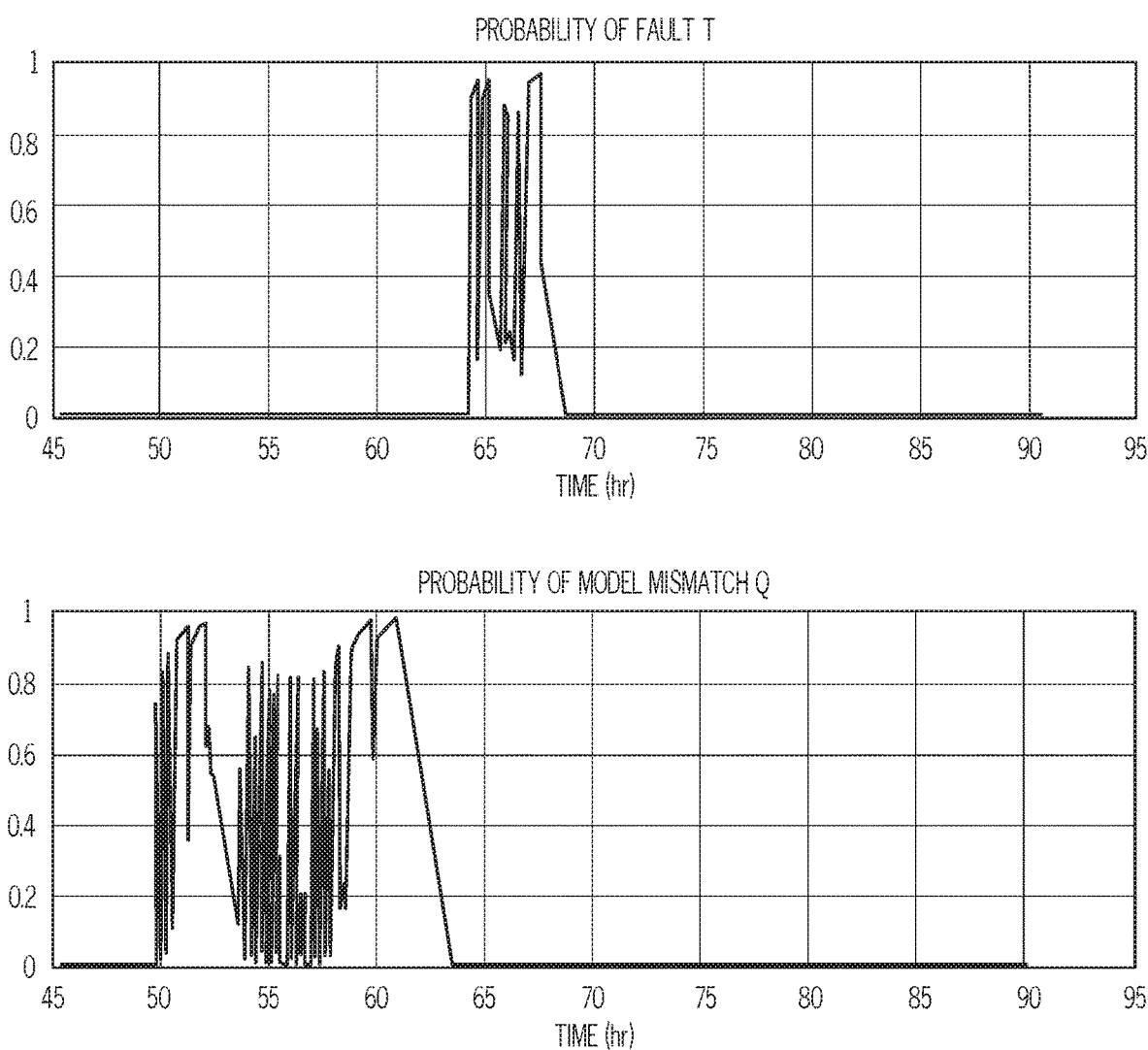
FIG. 6B graphically depicts an illustrative probability of fault based on the $T^2$ statistical plot of FIG. 6A and an illustrative probability of model mismatch based on the Q statistical plot of FIG. 6A according to one or more embodiments shown and described herein.

Referring to FIG. 5B in view of FIG. 5A, the probability of fault (e.g., p_fault) increases with each consecutive observation of $T^2$ above the $T^2_{threshold}$ 502 (e.g., represented by the dashed line) in FIG. 5A. The increases in the probability of fault are attributed to a growing number of consecutive observations of $T^2$ above the $T^2_{threshold}$ 502. The decreases in the probability of fault correspond to each observation of $T^2$ below the $T^2_{threshold}$ 502. Notably, in view of FIG. 5B, the probability of model mismatch (e.g., p_mismatch) remains zero since the observations of Q remain below $Q_{threshold}$ 504 (e.g., represented by the dashed line in FIG. 5A FIG. 6A graphically depicts an illustrative $T^2$ statistical plot and an illustrative Q statistical plot based on continuous operational data associated with a non-faulty electronic device over a same period of time according to various aspects of the present disclosure. FIG. 6B graphically depicts an illustrative probability of fault (e.g., p_fault) based on the $T^2$ statistical plot of FIG. 6A and an illustrative probability of model mismatch (e.g., p_mismatch) based on the Q statistical plot of FIG. 6A according to various aspects of the present disclosure.

Referring to FIG. 6B in view of FIG. 6A, the probability of fault (e.g., p_fault) between hour 50 and hour 60 remains zero since the observations of $T^2$ remains below $T^2_{threshold}$ 602 (e.g., represented by the dashed line) in FIG. 6A. However, the Q statistics between hour 50 and hour 60 indicate a departure from the current multivariate statistical model (e.g., PCA model) since the observations of Q are above $Q_{threshold}$ 604 (e.g., represented by the dashed line) in FIG. 6A. This departure is reflected by the resulting probability of model mismatch between hour 50 and hour 60 as depicted in FIG. 6B. Notably, (e.g., in line with block 440 of FIG. 4), according to various aspects of the present disclosure, an existing multivariate statistical model (e.g., existing PCA model) may be substituted with and/or updated to a new PCA model by signaling a retraining (e.g., at 60 hrs, 49 min, 54 sec). In such an aspect, during retraining, the local component 200 of the vehicle 110 and/or the server computing device 130 may ignore the observations of $T^2$ above $T^2_{threshold}$ 602 (e.g., between hour 64 and hour 67) and the corresponding probabilities of fault (e.g., p_fault) as depicted (e.g., between hour 64 and hour 67) in FIG. 6B. Absent the process of FIG. 4 and the model mismatch and fault detection logic of the present disclosure, a false positive signal indicating a fault in the electronic device may have been issued. Such a false positive signal may have resulted in an unnecessary restart and/or replacement of the electronic device.

It should now be understood that the systems and methods described herein are suitable for computing, on-vehicle and in real time, a probability of a model mismatch and a probability of a fault associated with an electronic device (e.g., a power converter, a semiconductor device, and/or the like) using the model mismatch and fault detection logic as described herein. According to various aspects, the model mismatch and fault detection logic not only evaluates $T^2$ statistics and Q statistics relative to respective $T^2$ and Q thresholds but also increments a probability of model mismatch and a probability of fault based on consecutive iterations where $T^2$ statistics and Q statistics exceed their respective $T^2$ and Q thresholds and decrements the probability of model mismatch and the probability of fault based on each iterations where a $T^2$ statistics and a Q statistic does not exceed its respective $T^2$ and Q threshold. Accordingly, the model mismatch and fault detection logic of the present disclosure may add robustness to the system and/or the method by suppressing or rejecting a false alarm caused by a short excursion (e.g., a deviation from a regular pattern, path, or level of operation) that is not attributable to faulty operation of the electronic device. Suppressing or rejecting a false alarm may avoid unnecessary costs (e.g., labor and replacement costs of an electronic device that is not actually defective or faulty), unnecessary delays (e.g., unavailability due to electronic device restarts, and/or the like), and/or unnecessary user frustration (e.g., trouble light illumination when no electronic device is actually defective or faulty).

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system, comprising:
   one or more sensors positioned relative to an electronic device to detect operational data associated with the electronic device; and
   a processing device communicatively coupled to the one or more sensors and configured to:
   compute at least two model metrics over a time period based on the operational data, the at least two model metrics including $T^2$ statistics and Q statistics; and
   apply logic based on the $T^2$ statistics and Q statistics computed over the time period, wherein the logic:
   counts consecutive instances where a computed $T^2$ statistic exceeds a threshold via a $T^2$ counter;
   updates a probability of fault associated with the electronic device over the time period based on the $T^2$ counter;
   counts consecutive instances where a computed Q statistic exceeds a Q threshold via a Q counter;
   updates a probability of model mismatch associated with the electronic device over the time period based on the Q counter; and
   detects one of a fault with the electronic device or a model mismatch after a number of consecutive instances of the $T^2$ statistic exceeding the $T^2$ threshold result in the probability of fault exceeding a probability of fault threshold and if a model mismatch has not been simultaneously detected.

2. The system of claim 1, wherein the programming instructions, when executed by the processing device, further cause the processing device to:
   build a multivariate statistical model based at least on training data received from the one or more sensors, wherein the at least two model metrics are associated with the multivariate statistical model.

3. The system of claim 1, wherein the programming instructions, when executed by the processing device, further cause the processing device to:

dynamically modify the probability of fault threshold based on a predetermined group of tiered thresholds.

4. The system of claim 1, wherein the model mismatch and fault detection logic detects the model mismatch after a plurality of consecutive instances of the Q statistic exceeding the Q threshold result in the probability of model mismatch exceeding a probability of model mismatch threshold.

5. The system of claim 4, wherein the model mismatch and fault detection logic further, after detection of the model mismatch, retrains a multivariate statistical model associated with the electronic device.

6. The system of claim 1, wherein the probability of fault is expressed by the following equation:

$$R \geq R_0 = (1 - (1 - A^{n+1}) * C)^{\frac{1}{n+1}}$$

where R is the probability of fault, $R_0$ is a lower bound on the probability of fault, A is a prior probability of fault, C is a confidence associated with the $T^2$ statistic, and n is the number of consecutive observations above the $T^2$ threshold.

7. A system, comprising:
a server;
one or more sensors positioned relative to an electronic device to detect operational data associated with the electronic device; and
a vehicle communicatively coupled to the server and the sensors, the vehicle configured to:
  compute at least two model metrics over a time period based on the operational data, the at least two model metrics including $T^2$ statistics and Q statistics; and
  apply logic based on the $T^2$ statistics and Q statistics computed over the period of time, wherein the logic:
    counts consecutive instances where a computed $T^2$ statistic exceeds a $T^2$ threshold via a $T^2$ counter;
    updates a probability of fault associated with the electronic device over the time period based on the $T^2$ counter;
    counts consecutive instances where a computed Q statistic exceeds a Q threshold via a Q counter;
    updates a probability of model mismatch associated with the electronic device over the time period based on the Q counter; and
    detects one of a fault with the electronic device or a model mismatch after a number of consecutive instances of the $T^2$ statistic exceeding the $T^2$ threshold result in the probability of fault exceeding a probability of fault threshold and if a model mismatch has not been simultaneously detected.

8. The system of claim 7, wherein the programming instructions, when executed by the processing device, further cause the processing device to:
build a multivariate statistical model based at least on training data received from the one or more sensors, wherein the at least two model metrics are associated with the multivariate statistical model.

9. The system of claim 7, wherein the programming instructions, when executed by the processing device, further cause the processing device to:
dynamically modify the probability of fault threshold based on a predetermined group of tiered thresholds.

10. The system of claim 7, wherein the model mismatch and fault detection logic detects the model mismatch after a number of consecutive instances of the Q statistic exceeding the Q threshold result in the probability of model mismatch exceeding a probability of model mismatch threshold.

11. The system of claim 10, wherein the model mismatch and fault detection logic further, after detection of the model mismatch, retrains a multivariate statistical model associated with the electronic device.

12. The system of claim 7, wherein the probability of fault is expressed by the following equation:

$$R \geq R_0 = (1 - (1 - A^{n+1}) * C)^{\frac{1}{n+1}}$$

where R is the probability of fault, $R_0$ is a lower bound on the probability of fault, A is a prior probability of fault, C is a confidence associated with the $T^2$ statistic, and n is the number of consecutive observations above the $T^2$ threshold.

13. A computer-implemented method, comprising:
computing, by a processing device, at least two model metrics over a time period based on operational data associated with an electronic device from one or more sensors positioned relative to the electronic device, the at least two model metrics including $T^2$ statistics and Q statistics; and
applying, by the processing device, logic based on the $T^2$ statistics and Q statistics computed over the time period, wherein the model mismatch and fault detection logic:
  counts consecutive instances where a computed $T^2$ statistic exceeds a $T^2$ threshold via a $T^2$ counter;
  updates a probability of fault associated with the electronic device over the time period based on the T2 counter;
  counts consecutive instances where a computed Q statistic exceeds a Q threshold via a Q counter;
  updates a probability of model mismatch associated with the electronic device over the time period based on the Q counter; and
  detects one of a fault with the electronic device or a model mismatch after a number of consecutive instances of the $T^2$ statistic exceeding the $T^2$ threshold result in the probability of fault exceeding a probability of fault threshold and if a model mismatch has not been simultaneously detected.

14. The computer-implemented method of claim 13, further comprising:
building a Principal Component Analysis (PCA) model based at least on training data received from the one or more sensors, wherein the at least two model metrics are associated with the PCA model.

15. The computer-implemented method of claim 13, wherein the model mismatch and fault detection logic detects the model mismatch after a number of consecutive instances of the Q statistic exceeding the Q threshold result in the probability of model mismatch exceeding a probability of model mismatch threshold.

16. The computer-implemented method of claim 15, wherein the model mismatch and fault detection logic further, after detection of the model mismatch, retrains a multivariate statistical model associated with the electronic device.

17. The computer-implemented model of claim 13, further comprising:
building a multivariate statistical model based at least on training data received from the one or more sensors, wherein the at least two model metrics are associated with the multivariate statistical model.

18. The computer-implemented method of claim 13, further comprising:
dynamically modifying the probability of fault threshold based on a predetermined group of tiered thresholds.

19. The computer-implemented method of claim 13, wherein the probability of fault is expressed by the following equation:

$$R \geq R_0 = (1 - (1 - A^{n+1}) * C)^{\frac{1}{n+1}}$$

where R is the probability of fault, $R_0$ is a lower bound on the probability of fault, A is a prior probability of fault, C is a confidence associated with the $T^2$ statistic, and n is the number of consecutive observations above the $T^2$ threshold.

* * * * *